United States Patent [19]
Yanagisawa et al.

[11] Patent Number: 5,878,272
[45] Date of Patent: Mar. 2, 1999

[54] COMPUTER SYSTEM HAVING TWO DMA CIRCUITS ASSIGNED TO THE SAME ADDRESS SPACE

[75] Inventors: Takashi Yanagisawa, Yokohama; Masayoshi Taniguchi, Moriyama; Masayoshi Nakano, Yamoto, all of Japan

[73] Assignee: International Business Machines Corp., Armonk, N.Y.

[21] Appl. No.: 710,453

[22] Filed: Sep. 18, 1996

[30] Foreign Application Priority Data

Dec. 14, 1995 [JP] Japan ................................ 7-325476

[51] Int. Cl.⁶ .................................................. G06F 13/42
[52] U.S. Cl. ........................................ 395/823; 395/822
[58] Field of Search .................................. 395/821, 822, 395/823, 828, 842, 847, 281, 306, 308

[56] References Cited

U.S. PATENT DOCUMENTS

| | | | |
|---|---|---|---|
| 5,396,602 | 3/1995 | Amini et al. ........................... | 395/238.3 |
| 5,450,551 | 9/1995 | Amini et al. ........................... | 395/308 |
| 5,561,820 | 10/1996 | Bland et al. ........................... | 395/308 |
| 5,590,377 | 12/1996 | Smith ........................... | 395/842 |
| 5,613,162 | 3/1997 | Kabenjian ........................... | 395/843 |
| 5,621,900 | 4/1997 | Lane et al. ........................... | 395/281 |
| 5,621,902 | 4/1997 | Cases et al. ........................... | 395/287 |
| 5,664,197 | 9/1997 | Kardach et al. ........................... | 395/287 |
| 5,671,366 | 9/1997 | Niwa et al. ........................... | 395/652 |
| 5,673,400 | 9/1997 | Kenny ........................... | 395/308 |
| 5,682,483 | 10/1997 | Wu et al. ........................... | 395/284 |
| 5,713,006 | 1/1998 | Shigeeda ........................... | 395/653 |

*Primary Examiner*—William M. Treat
*Assistant Examiner*—Andrew Caldwell
*Attorney, Agent, or Firm*—Daniel E. McConnell

[57] ABSTRACT

A computer system has a central processing unit ("CPU") and a plurality of peripheral devices. A bus interconnects the CPU and the peripheral devices. Command signals are transmitted over the bus including an initiator ready signal ("IRDY"), a device select signal ("DEVSEL"), and a target ready signal ("TRDY"). First and second direct memory access devices ("DMA") are connected to the bus and assigned the same address space. First and second switches selectively connect and disconnect the DEVSEL and TRDY signals that are output from the first and second DMA devices, respectively. Controller logic receives the DEVSEL and TRDY signals and directs the opening and closing of the first and second switches.

12 Claims, 8 Drawing Sheets

I/O WRITE (I) BUS CYCLE ON PRIMARY PCI BUS (II) RESPONSE BY CONTROLLER TO INITIATOR (III) RESPONSE BY DMA CONTROLLER 1

(IV) BUS CYCLE ON SECONDARY PCI BUS

DATA 1: CONTROL REGISTER VALUE OF DMA CONTROLLER 1
DATA 2: DATA VALUE OBTAINED BY MULTIPLEXING CONTROL REGISTER VALUES OF DMA CONTROLLERS 1 AND 2

COMPUTER SYSTEM HAVING TWO DMA CIRCUITS ASSIGNED TO THE SAME ADDRESS SPACE

BACKGROUND OF THE INVENTION

The present invention relates to an information processing system that can be mounted on a docking station, and to a control method therefor; and in particular to an information processing system that can precisely perform DMA transfer operations even if DMA controller chips are used in both the information processing system and the docking station, and to a control method therefor.

More specifically, the present invention pertains to an information processing system that can precisely perform DMA transfers even if DMA controller chips exist both in a local system and a docking station, and to a control method therefor; and particularly to an information processing system that can preferably perform DMA transfer operations even if the same I/O port address is assigned for coexisting DMA controllers, and to a control method therefor.

As a consequence of recent technical developments, various types of personal computers (PCs), such as desktop types and notebook types, have been produced and are available on the market.

In a computer system, a Central Processing Unit or CPU for controlling the operation of an entire system communicates with memory and other peripheral devices across a common signal transfer path called a "bus". The "bus" consists of multiple signal lines, such as a data signal line, an address signal line and a control signal line.

The ISA (Industry Standard Architecture) bus is widely known as a standard bus architecture. The ISA bus was adopted for the IBM PC/AT (PC/AT is a trademark of IBM Corp.), i.e., was designed for a CPU chip 80286 (with a local bus width of 16 bits) that is produced by Intel Corp. The primary performance features of the ISA bus are a 16-bit bus width, an operating clock of 8 MHz, and a maximum transfer speed of 4 mbps. The ISA bus, a de facto standard of a bus architecture, is the most popular, and many compatible (i.e., mountable and normally operating) expansion boards, peripheral devices and software programs (OS, BIOS, applications, etc.) are provided for it. In other words, the ISA bus is a legacy bus that has inherited much from the past.

Since at the beginning almost all CPU chips were operated at relatively low clock speeds, such as 8 MHz or 12 MHz, the ISA bus could be operated at the same clock speeds as those of the CPUs. However, as the performance available with CPU chips has been increased (e.g., 486 or Pentium, produced by Intel Corp., or PowerPC 6xx developed by IBM Corp. (PowerPC is a trademark of IBM Corp.)), the ISA bus has steadily hindered the utilization of improvements to the CPUs. Further, there has been an increase in the devices (adaptor cards) that require high speed data transfer, such as graphic video sub-systems, full motion video sub-systems, SCSI (Small Computer System Interface) storage sub-systems, and network sub-systems, and these devices do not function satisfactorily with the ISA bus.

The PCI (Peripheral Component Interconnect) architecture bus can compensate for the slow data transfer speed of the ISA bus. The PCI bus is a bus that was originally proposed by Intel Corp., which published the specifications in 1991, with which high speed operation is possible. Its primary performance features are a 32-bit bus width, an operating frequency of 33 MHz, and a maximum transfer speed of 132 mbps. Another feature of the PCI bus is that it is so designed that it can be connected to all other buses by using bridge circuits. For example, a PCI bus can be mutually connected to a CPU by a "host-PCI bridge circuit", to an ISA bus by a "PCI-ISA bridge circuit", and to another PCI bus by a "PCI-PCI bridge circuit". Since the individual buses connected by bridge circuits are driven independently, i.e., asynchronously, no problem concerning electrical characteristics and operating stability arises.

While some current high performance PCs employ an ISA bus for which hardware and software assets are abundant, other PCs have adopted PCI buses as high speed buses that are used for graphic processing. In FIG. 8 is schematically shown the hardware arrangement of a high performance PC. As is shown in FIG. 8, the system has a two layered structure, such as a PCI bus (local bus) 16 and an ISA bus (system bus) 22. A processor bus 12, that is directly connected to an external pin of a CPU 11, communicates with the PCI bus 16 via a bridge circuit (host-PCI) 14. To the PCI bus 16 are connected to devices, such as a video controller 17A, for which relatively-high speed operations are required. The ISA bus 22 communicates with the PCI bus 16 via a bridge circuit (PCI-ISA) 20, and is also connected to relatively low speed operating devices, such as a floppy disk controller (FDC), a serial port, a parallel port, a keyboard 26, and a mouse 27.

To this point, an explanation has been given for a common personal computer without defining it as a desktop or a notebook type. However, a notebook computer, for which compact size, light weight, and portability are important, must be clearly distinguished from a desktop computer. For example, as a notebook computer is small and has less available storage space, and the surface area of the notebook computer is small, the number of bus slots that can be installed is very limited (while it is not rare for a desktop computer to have ten or more bus slots, for a laptop/notebook computer, no bus slots, or one or two at most, are provided.). Although portability is the biggest feature of a notebook computer, if cables (e.g., a printer cable, a monitor cable, and a communication cable) must be attached to and detached from the ports on the computer body each time the computer is to be used on a desk or to be removed from the desk, the handling will be complicated and the portability will also be deteriorated.

A so-called docking station (also called an "expansion box" or an "expansion unit") provides for a notebook computer the same working environment as that of a desktop computer, without any deterioration of the portability of the notebook computer, when the notebook computer is to be used in the office. The primary functions of the docking station are "port replication" and "bus expansion". The port replication can be realized by the expanding the connection ports of the notebook computer. That is, when a cable is connected in advance to each port of the docking station, a user can immediately use a printer, a monitor and a network simply by mounting the notebook computer on the docking station. The bus expansion can be realized by expanding the bus in the notebook computer and the provision of a bus slot. Therefore, a user can insert desired adapter cards into a docking station without any restriction. It should be noted that a docking station is disclosed in, for example, Japanese Patent Application No. Hei 06-134124 (Our ref. No. JA9-94-030), which was assigned to the present applicant.

Most of the conventional docking stations are those for expanding an ISA bus in a system. This follows from the fact that the ISA bus has a significant legacy. However, there is a recently increased demand for the expansion of local buses, i.e., PCI buses. This is because the number of adapter cards that can be inserted into a single PCI bus is limited to ten at most in order to maintain the electric characteristic and the stability of the PCI bus (it should be noted that a device connected by a connector is regarded as two devices).

FIG. 9 is a schematic diagram illustrating the hardware arrangements for a docking station providing a bus expansion function for a PCI bus, and a notebook computer that is coupled to the docking station. As is shown in FIG. 9, the docking station has not only a PCI bus (a secondary PCI bus) 50 but also an ISA bus (a secondary ISA bus) 53 for the purpose of inheriting the legacy available for the ISA bus. The secondary PCI bus 50 and ISA bus 53 communicate with each other via a bridge circuit (PCI-ISA) 51. A PCI bus (a primary PCI bus) 16 in the notebook computer and the secondary PCI bus 50 communicate with each other via a bus connection controller 60. The bus connection controller 60, which serves as a PCI-PCI bridge circuit, receives a bus signal from the primary PCI bus 16 and drives the secondary PCI bus 50 in accordance with that received bus signal. The docking station includes internally at least one PCI slot and one ISA slot, and has more than one connection ports on its surface.

Almost all the personal computers that are currently available on the market utilize a technique called DMA (Direct Memory Access). DMA is an operation by which a data transfer between a peripheral controller, such as a floppy disk controller, and main memory is performed without the involvement of a CPU. The process of reading data from the disk and storing the data in memory is a frequently repeated task (for example, when loading an application). Since the CPU is not involved in the DMA data transfer operations, it can be engaged in performing another job while the transfer is taking place. In other words, DMA transfer is a technique whereby the possibility is avoided that a CPU will be monopolized by a specific peripheral device for a long time, and thus the system throughput is improved.

Most of the ISA devices, such as floppy disk drives, printers and audio controllers, that are operated at a relatively low speed perform DMA data transfer and permit the CPU to perform another job. A special LSI for controlling DMA transfers, i.e, a DMA controller, is employed. The DMA controller for controlling DMA transfers across an ISA bus can be regarded as one of the legacies of the ISA bus. Since the DMA controller must be driven in synchronization with an ISA device that requests DMA transfer, it must be located in the vicinity of the ISA bus. In the system shown in FIG. 8, for example, a DMA controller (hereinafter referred to as a "first DMA controller") is located in the PCI-ISA bridge circuit 20 so as to preferably respond to a DMA request on the ISA bus 22.

In the system shown in FIG. 9, the ISA buses are located both in the notebook computer and in the docking station. As the DMA controller has to be synchronized with the operation of the bus, a DMA controller (hereinafter referred to as a "second DMA controller") must be located in the bridge circuit 51 of the docking station.

As well known, a CPU controls its peripheral devices by accessing (including both read access and write access) the control registers of the peripheral devices. As a method for accessing the control registers, there are a "memory mapped I/O method" for allocating the control registers to one part of a physical address space, and an "I/O address method" for allocating the control registers to an input/output address space (I/O space) that is prepared separately from a physical address space. An explanation will be given specifically for the I/O address method. The I/O address method is a control method that can be employed only by a system in which is mounted a CPU chip (e.g., an x86 chip from Intel Corp.) that has a function for handing an I/O address space. The CPU controls its peripheral devices by accessing (i.e., performing I/O accessing) an I/O address assigned for a control register of each peripheral device.

The previously mentioned DMA controller is one of the peripheral devices for the CPU. In an IBM PC/AT compatible machine (hereinafter referred to simply as an "AT compatible machine"), for example, I/O port addresses, address 000h to address 01Fh, address 0C0h to address 0DFh, and address 080h to address 09Fh, are assigned for the control register of the DMA controller. To begin a DMA transfer, the CPU (more specifically, a BIOS or a device driver that physically operates peripheral devices) must set control values in advance, such as a transfer start address and the amount of data transfer words, in the control register. In other words, the CPU has to perform an I/O access of the control register of the DMA controller.

According to the standard specifications for the IBM PC/AT, however, only one DMA controller can be present in an I/O address space. This means that even when two or more DMA controllers exist, the same I/O port address is assigned to the control registers of the second DMA controller. That is, even if two independent DMA controllers exist physically, they can not be distinguished and separately identified in the I/O address space, i.e., by viewing from the CPU side (see FIG. 10).

Although the DMA transfer may be intended to be performed for an FDC connected to the secondary ISA bus 53, the BIOS (or the device driver) may mistakenly access the control register of the DMA controller on the primary ISA bus 22 side, reading or writing meaningless control data so that it performs meaningless control. The unwanted control based on the meaningless control data may threaten the security of the system.

The DMA controller that is present along the primary PCI bus 16 can respond to the I/O access at an earlier time than can the DMA controller along the secondary PCI bus 50, which communicates with the primary PCI bus 16 via the bus connection controller 60, because a delay accrues to a bus cycle on the secondary PCI bus side due to its passing through the bus connection controller 60. As a result, even when the second DMA controller on the secondary PCI bus 50 must respond to an I/O access request, for example, when a DMA request occurs on the secondary ISA bus 53, the first DMA controller on the primary PCI bus 16 responds to the request earlier than the second DMA controller. In other words, I/O access of a different target is performed. Such an I/O access of a different target may threaten the security of the system.

SUMMARY OF THE INVENTION

It is one purpose of the present invention to provide an information processing system that can be mounted on a docking station, and a control method therefor.

It is another purpose of the present invention to provide an information processing system that can precisely perform a DMA transfer while the system is mounted on a docking station, and a control method for such transfers.

It is an additional purpose of the present invention to provide an information processing system that can precisely perform a DMA transfer even when a DMA controller exists both in the system and in a docking station, and a control method therefor.

It is a further purpose of the present invention to provide an information processing system that can adequately perform a DMA transfer even when the same I/O port address is assigned for coexisting DMA controllers, and a control method therefor.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENTS(S)

Figure 1:
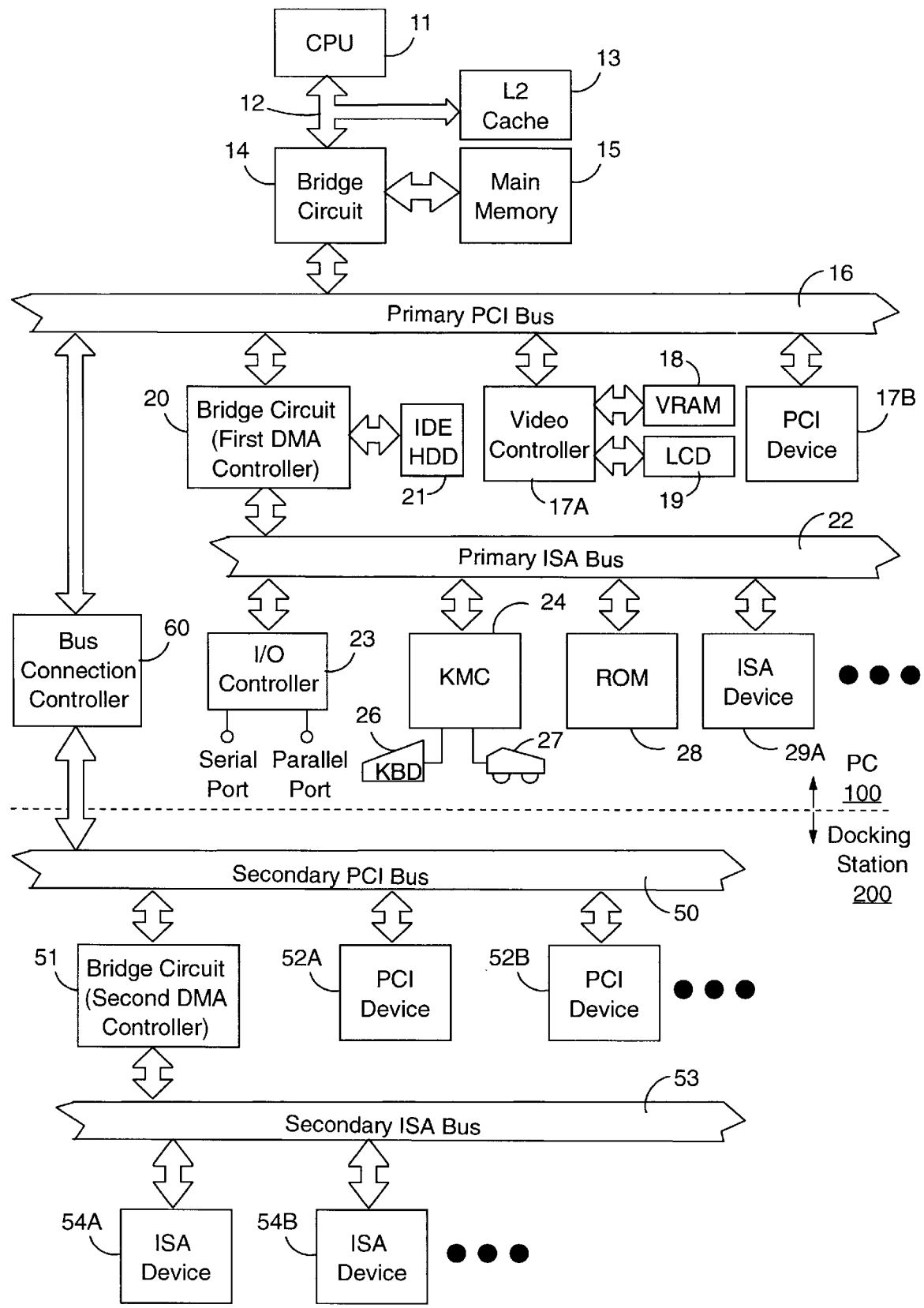
FIG. 1 is a diagram illustrating the hardware arrangements of a personal computer (PC) 100 and a docking station 200 that are employed for carrying out the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

To achieve the purposes briefly stated above, an information processing system of the type which includes a CPU and one or more peripheral devices, and in which the CPU controls the peripheral devices by assigning the respective I/O addresses to the control registers of the peripheral devices, has a first DMA controller for which a predetermined I/O address is assigned; a second DMA controller for which the predetermined I/O address is assigned; and a controller logic which, when a request for I/O access of the predetermined I/O address occurs, replicates operations of the first and the second DMA controllers so as to respond to the CPU.

According to another aspect of the present invention, an information processing system, of the type in which a CPU controls peripheral devices by employing an I/O access method, has (a) a bus, for forming an interconnection between the CPU and the peripheral devices, across which handshaking occurs between a command transmitting device activating an initiator ready (IRDY) signal and a command receiving device activating a device select (DEVSEL) signal and a target ready (TRDY) signal; (b) a first DMA controller, connected to the bus, for which a predetermined I/O address is assigned; (c) a second DMA controller, connected to the bus, for which the predetermined I/O address is assigned; (d) first connection/disconnection switch selectively connecting and disconnecting a device select (DEVSEL) signal and a target ready (TRDY) signal that are output from the first DMA controller; (e) second connection/disconnection switch selectively connecting and disconnecting a device select (DEVSEL) signal and a target ready (TRDY) signal that are output from the second DMA controller; and (f) a controller logic, connected to the bus, for receiving the device select (DEVSEL) signals and the target ready (TRDY) signals that are output by the first and the second DMA controllers, and for opening and closing the first and the second connection/disconnection switches in accordance with I/O accesses that occur on the bus.

The controller logic can disconnect the first and the second connection/disconnection switches during a bus cycle wherein the predetermined I/O address, which is reserved for the DMA controller, is accessed.

When a request occurs for access to the predetermined I/O address, which is reserved for the DMA controller, the controller logic disconnects the first and the second connection/disconnection switches, and may activate the device select (DEVSEL) signal on the bus and activate the target ready (TRDY) signal on the bus in response to the target ready (TRDY) signal being output by both the first and the second DMA controllers.

When an access to the predetermined I/O address, which is reserved for the DMA controller, is a write access, the first and the second DMA controllers can unchanged write data, which are received across the bus, into their own control registers respectively.

When an access to the predetermined I/O address, which is reserved for the DMA controller, is a read access, the controller logic multiplexes contents of the control registers of the first and the second DMA controllers and transmits the resultant data to the bus. A multiplexing process may be performed in accordance with the reserve table of DMA channels of the first and the second DMA controllers.

When a request occurs for access to the predetermined I/O address, which is reserved for the DMA controller on the bus, the controller logic does not terminate an access cycle, by inhibiting the activation of the target ready (TRDY) signal on the bus, until the target ready (TRDY) signal is output by both the first and the second DMA controllers.

The bus may conform to the specifications for the PCI (Peripheral Component Interconnect) bus.

According to another aspect of the present invention, a control method, for an information processing system that includes more than one peripheral device; a CPU of the type which controls the peripheral devices by using an I/O access method; a bus for forming an interconnection between the CPU and the peripheral devices, across which handshaking occurs between a command transmitting device activating an initiator ready (IRDY) signal and a command receiving device activating a device select (DEVSEL) signal and a target ready (TRDY) signal; a first DMA controller, connected to the bus, for which a predetermined I/O address is assigned; and a second DMA controller, connected to the bus, for which the predetermined I/O address is assigned, has the steps of: (a) initiating an access by the CPU to the predetermined I/O address; (b) activating the device select (DEVSEL) signal on the bus in response to the access being initiated; and (c) activating the target ready (TRDY) signal on the bus in response to the target ready (TRDY) signal being output by both of the first and the second DMA controllers.

When an access to the predetermined I/O address is a write access, the first and the second controllers may unchanged write data, which are received across the bus, into their own control registers respectively.

When an access to the predetermined I/O address is a read access, contents of the control registers of the first and the second DMA controllers is multiplexed and the resultant data is transmitted to the bus. A multiplexing process is performed in accordance with the reserve table of DMA channels of the first and the second DMA controllers.

The bus may conform to PCI (Peripheral Component Interconnect) specifications.

According to yet another aspect of the present invention, an information processing system, wherein a CPU controls peripheral devices by employing an I/O access method, and wherein the CPU communicates with the peripheral devices via a bus across which handshaking occurs between a command transmitting device activating an initiator ready (IRDY) signal and a command receiving device activating a device select (DEVSEL) signal and a target ready (TRDY) signal, comprises: (a) a first peripheral device, connected to the bus, for which a predetermined I/O address is assigned; (b) a second peripheral device, connected to the bus, for which the predetermined I/O address is assigned; (c) a first connection/disconnection switch connecting and disconnecting a device select (DEVSEL) signal and a target ready (TRDY) signal that are output from the first peripheral device; (d) a second connection/disconnection switch connecting and disconnecting a device select (DEVSEL) signal and a target ready (TRDY) signal that are output by the second peripheral device; and (e) a controller logic, connected to the bus, for receiving the device select (DEVSEL) signals and the target ready (TRDY) signals that are output by the first and the second peripheral devices, and for opening and closing the first and the second connection/disconnection switches in response to I/O accesses that occur on the bus.

The controller logic disconnects the first and the second connection/disconnection switches during a bus cycle wherein the predetermined I/O address, which is reserved for the first and the second peripheral controllers on the bus, is accessed.

When a request occurs for access to the predetermined I/O address, the controller logic disconnects the first and the second connection/disconnection switches, and activates the device select signal (DEVSEL) on the bus and the target ready (TRDY) signal on the bus in response to the target ready (TRDY) signal being output by both the first and the second peripheral devices.

When a request occurs for access to the predetermined I/O address, the controller logic does not terminate an access cycle, by inhibiting the activation of the target ready (TRDY) signal on the bus, until the target ready (TRDY) signal is output by both the first and the second peripheral devices.

According to a fifth aspect of the present invention, an information processing system, wherein a CPU controls peripheral devices connected across a bus by employing an I/O access method, and wherein a single bus cycle is completed by handshaking between the CPU and the peripheral devices on the bus, comprises: (a) a first peripheral device, connected to the bus, for which a predetermined I/O address is assigned; (b) a second peripheral device, connected to the bus, for which the predetermined I/O address is assigned; and (c) a controller logic for, when a bus cycle for I/O access of the first or the second peripheral device is begun, inhibiting a termination of the bus cycle until the handshaking is enabled between the first and the second peripheral devices and the CPU.

When the first DMA controller is provided in the PC main body and the second DMA controller is provided in the docking station, i.e., when two independent DMA controllers are physically present, the same I/O port address is reserved for their control registers, and logically, only one DMA controller can be seen in the I/O space. In other words, the CPU can not distinguish between the DMA controllers in performing I/O access.

In the information processing system according to the first or the second aspect of the present invention, even when the CPU tries to perform an I/O access of a DMA controller, the controller logic substitutes the first and the second DMA controllers and performs handshaking with the CPU. Therefore, a problem that may occur because the DMA controllers employ the same I/O port address can be resolved.

When the first DMA controller is provided in the PC main body and the second DMA controller is provided in the docking station, the first DMA controller can respond to an I/O access request from the CPU at an earlier time than the second DMA controller. Thus, when the DMA controllers employ the same I/O address in common, the first DMA controller performs handshaking with the CPU earlier than the second DMA controller, and an erroneous I/O read/write operation may be performed (previously mentioned).

According to the second aspect of the present invention, when the I/O access request to the DMA controller occurs, device select (DEVSEL) signals and target ready (TRDY) signals that are output from the first and the second DMA controllers are cut off from the bus, and the controller logic outputs these signals instead. More specifically, the controller logic does not output the target ready (TRDY) signal to the bus until both DMA controllers are in the ready state. In other words, even when only one of the DMA controllers can respond to the request, the I/O access cycle will not be terminated. Therefore, there is no possibility that the first DMA controller will freely perform handshaking with the CPU.

In the control method of the information processing system according to the third aspect of the present invention, when the I/O access request to the DMA controller occurs, the controller logic does not output the target ready (TRDY) signal to the bus until both the first and the second DMA controllers are in the ready state. In other words, even when only one of the DMA controllers can respond to the request, the I/O access cycle will not be terminated. Therefore, same as the second aspect, there is no possibility that the first DMA controller will freely perform handshaking with the CPU.

Since the same I/O port is reserved for the control registers of the two DMA controllers, the CPU can not designate one of the control registers. However, because of the restriction on the system arrangement, one DMA channel can not be used by two DMA controllers at the same time (for example, an FDC (floppy disk controller) for which DMA channel 2 may be designated can be connected to only one of the primary ISA bus and the secondary ISA bus). That is, physically, DMA channels are prepared for the individual first and second DMA controllers, but actually, at least one of the DMA channels is unused.

According to the second or the third aspect of the present invention, when the I/O access to the DMA controller is a write cycle, data are written, unchanged, to the control register of each DMA controller because whatever control value is set for an unused DMA channel will not affect the operation.

When the control data are to be read through a DMA channel, i.e., when the I/O access is a read cycle, data in the control register in the DMA controller that currently uses the corresponding DMA channel are transmitted. Further, a target ready signal is not output until both the first and the second DMA controllers are ready. Therefore, a condition is avoided wherein data are transmitted only from the first DMA controller, which responds quickly to the access, and the I/O access is terminated.

According to the standard specifications for the PCI bus, data transfer operation is performed in units of two words (=four bytes). In a single I/O read cycle, data other than a pertinent byte/bit field in the control register are also read together. According to the second and the third aspect of the present invention, in accordance with the system structure information, i.e., the reserve table of the DMA channel, data in the control registers of the DMA controllers are multiplexed and the resultant data are transmitted. For example, a byte/bit field in the control register that corresponds to DMA channel 2 is extracted from the DMA controller that is actually connected to the FDC.

When the same I/O port is reserved for the control registers of two peripheral devices, the CPU (more specifically, a BIOS or a device driver for physically controlling the peripheral devices) can not designate only one of the control registers. For example, when the first peripheral device is provided in the PC main body and the second peripheral device is provided in the docking station, the first peripheral device can respond to the I/O access request from the CPU at an earlier time than the second peripheral device. Thus, the first peripheral device performs handshaking with the CPU earlier than the second peripheral device, and an erroneous I/O read/write operation might be performed (previously described).

In the information processing system according to the fourth and the fifth aspects of the present invention, when an I/O access request occurs for either the first or the second peripheral devices that employs the same I/O address in common, the controller logic cuts off the device select (DEVSEL) signals and the target ready (TRDY) signals that are output by the first and the second peripheral devices, and substitutes for these devices to output these signals. More specifically, the controller logic does not output the target ready (TRDY) signal on the bus until both peripheral devices become ready. That is, the termination of an I/O access cycle is inhibited only by one of the DMA controllers responding to the access request. Therefore, there is no possibility that the first peripheral device will freely perform handshaking with the CPU.

Other objects, features and advantages of the present invention will become readily apparent during the course of the following detailed explanation of an embodiment, which is given while referring to the accompanying drawings.

Figure 8:
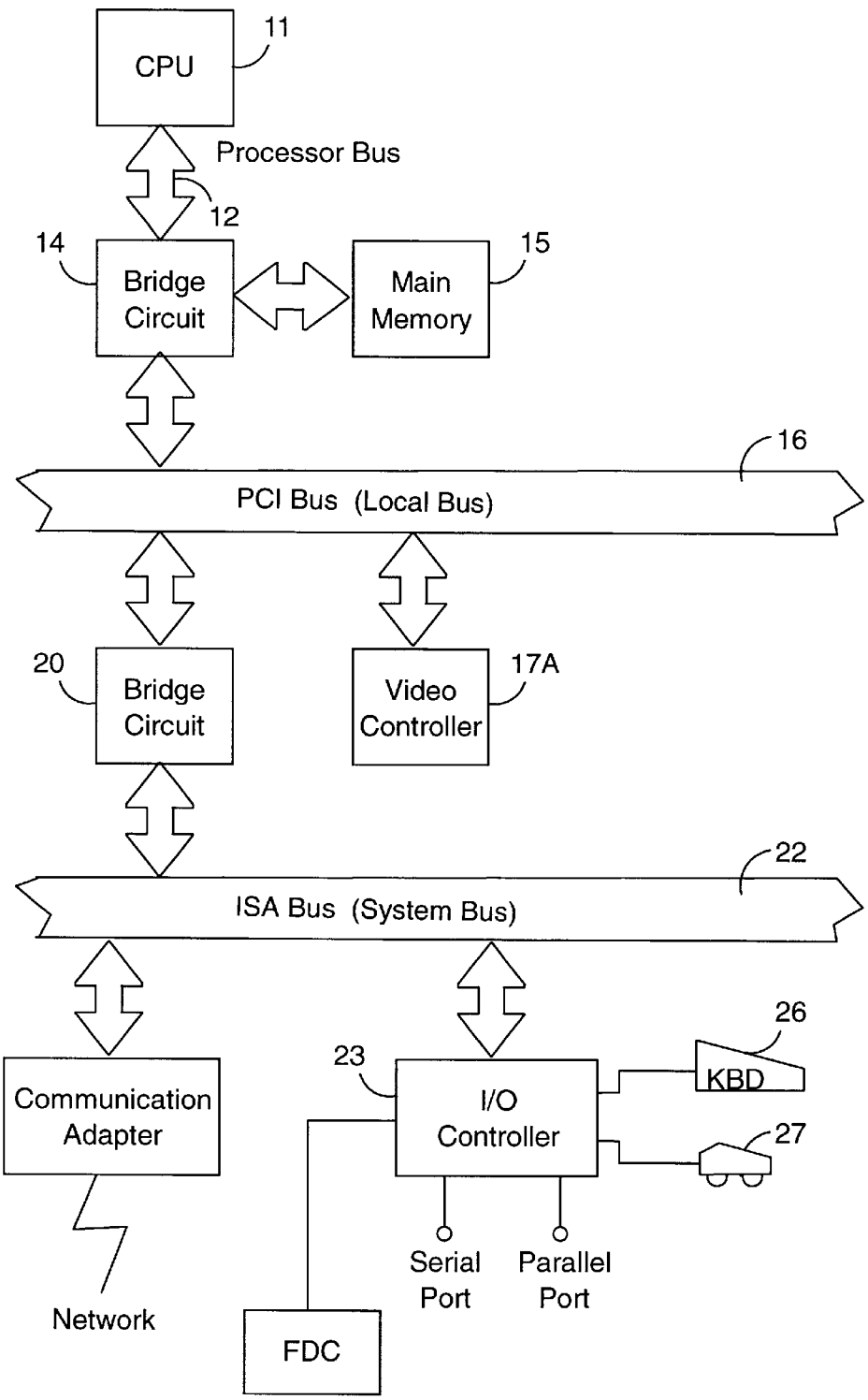
FIG. 8 is a schematic diagram illustrating the hardware arrangement of a PC.
Figure 9:
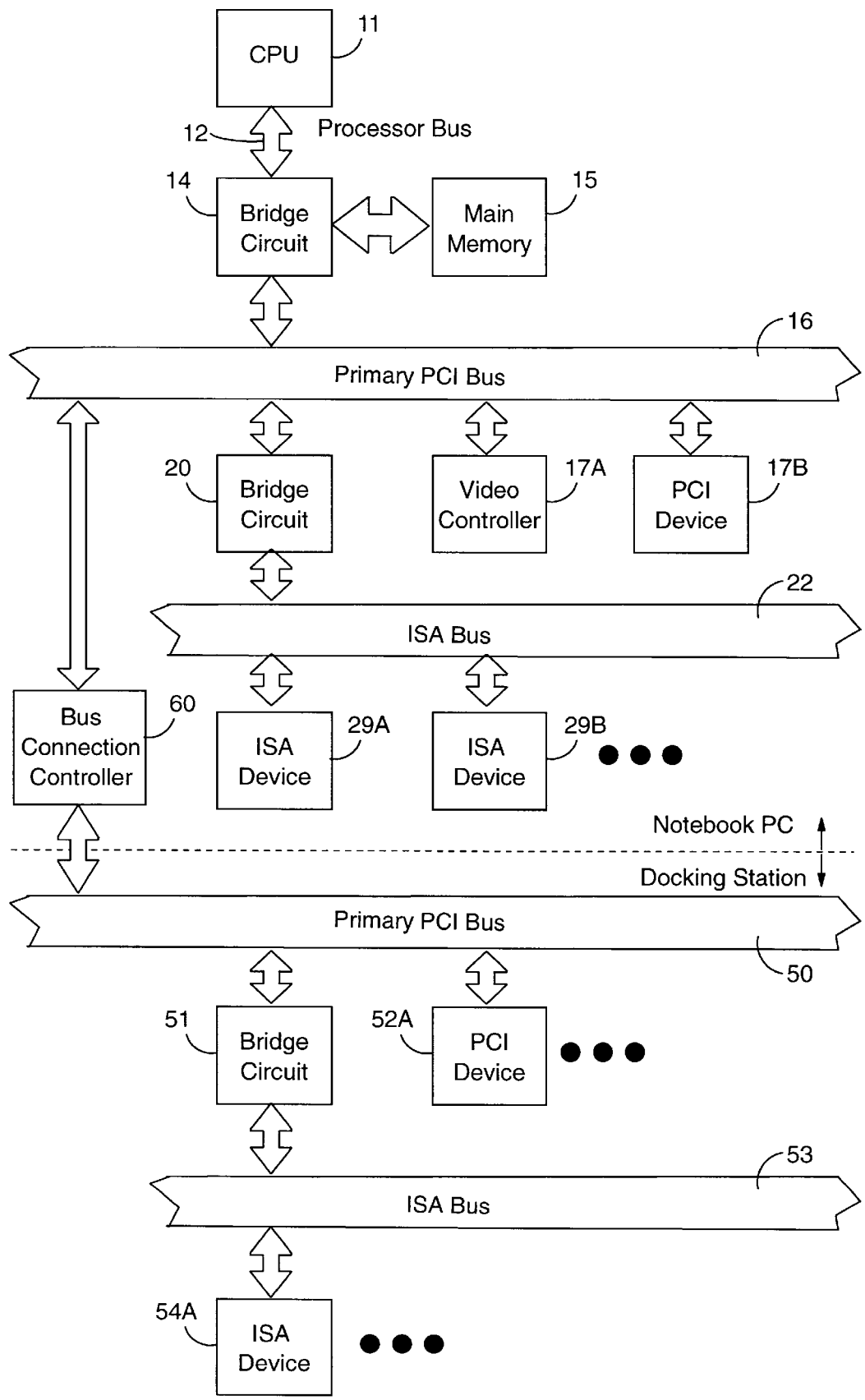
FIG. 9 is a schematic diagram illustrating the hardware arrangements of a docking station that has a bus expansion function for a PCI bus, and a notebook computer that is mounted in the docking station.

FIG. 1 is a diagram illustrating the hardware arrangements of a personal computer (PC) 100, which is employed for carrying out the present invention, and a docking station 200 connected to the PC 100. The same reference numbers as are used in FIGS. 8 and 9 are also used to denote corresponding or identical components. The individual sections will now be described.

A CPU 11, which is a main controller, executes various programs under the control of an operating system (OS). A processor bus 12, that is directly connected to the external pin of the CPU 11, communicates with the individual peripheral devices (which will be described later) in the PC 100 across a two-layer set of buses: a primary PCI bus (a local bus) 16, and a primary ISA bus (a system bus) 22. The CPU 11 may be CPU chip, a "Pentium/1xx MHz", which is marketed by Intel Corp.

The processor bus 12 communicates with the primary PCI bus 16 via a bridge circuit (host-PCI bridge) 14. The bridge circuit 14 in this embodiment includes a memory controller for controlling the access of a main memory 15, and a data buffer for absorbing a difference in speed between the buses 12 and 16. The main memory 15 is volatile memory into which programs (an OS and application programs) are loaded that the CPU 11 executes, and into which work data for the CPU 11 are stored. A block 13 is an external cache (also called a "Level 2 (L2) cache") for absorbing a difference between the processing speed of the CPU 11 and the speed of access to the main memory 15. Generally, a DRAM is used for the main memory 15 and an SRAM is used for the L2 cache 13.

To the primary PCI bus 16 are connected a video controller 17A, other PCI devices 17B for which relatively high speed data processing is required, etc. The video controller 17A, which is a peripheral controller for actually processing a drawing command from the CPU 11, temporarily writes processed image data in a screen buffer (VRAM) 18, and also reads the image data from the VRAM 18 and outputs it to a liquid crystal display (LCD) 19 which serves as display means.

The primary PCI bus 16 communicates with the primary ISA bus 22 via a bridge circuit (PCI-ISA bridge) 20. The bridge circuit 20 in this embodiment includes a DMA controller (a first DMA controller), an interrupt controller, and a programmable interval timer (PIT). The DMA controller is a dedicated controller for controlling data transfer operations (i.e., DMA transfer operations) between an ISA device 29A, etc. on the ISA bus 22 and the main memory 15, without the involvement of the CPU 11. The interrupt controller arbitrates interrupt requests (IRQ) that occur on the ISA bus 22 and notifies the CPU 11 of the interrupt requests. The PIT is a device for supplying several kinds of timer signals to the individual sections in the system 100.

The bridge circuit 20 also has an interface (e.g., an IDE interface) for connecting a hard disk drive (HDD) 21 as an auxiliary memory device (the IDE (Integrated Drive Electronics) specifications are the original interface standards for directly connecting an HDD to an ISA bus).

The above described bridge circuits 14 and 20 are specified by the PCI standards and are generally sold on the market in the form of a single chip set. A chip set example is "Triton"; which is sold by Intel Corp.

The ISA bus 22 is connected with peripheral devices operated at relatively low speeds: an I/O controller 23, a keyboard/mouse controller (KMC) 24, a ROM 28, and ISA devices 29A, etc.

The I/O controller 23 is a peripheral controller for controlling data input/output via a communication port, such as a serial port or a parallel port. One example of a serial port standard is RS-232C, and one example of a parallel port standard is Centronics.

The KMC 24 is a controller for processing scan data input at the keyboard 26 and a coordinate value pointed at by a mouse 27. The KMC 24 converts a signal input by means of the keyboard 26 or the mouse 27 into a format that matches the definition of the OS, and transmits the resultant signal to the bus 22.

The ROM 28, which is a non-volatile memory in which written data are determined during the manufacturing process, is employed to permanently store predetermined codes. The codes stored in the ROM 28 are a self diagnosis test program (POST), which is performed in initializing the system 100, and a program (BIOS) for providing hardware manipulating process for the hardware components in the system 100, for example.

When the PC 100 is mounted on the docking station 200, the primary PCI bus 16 of the PC 100 communicates with the secondary PCI bus 50 of the docking station 200 via the bus connection controller 60. The bus connection controller 60, which serves as a PCI-PCI bridge circuit, receives signals across the primary PCI bus 16 and also drives the secondary PCI bus 50 in accordance with the received signals. That is, the primary PCI bus 16 and the secondary PCI bus 50 are driven independently, i.e., asynchronously, so as to individually maintain their electric characteristics and stability. The bus connection controller 60 in this embodiment contributes greatly to the realization of the present invention, and it will be described in detail later in this description.

The secondary PCI bus 50 has at least one PCI slot (not shown) in which a desired PCI device 52A, etc. can be loaded.

The secondary PCI bus 50 communicates with a secondary ISA bus 53 via a bridge circuit (PCI-ISA bridge) 51. The bridge circuit 51 has substantially the same arrangement as the bridge circuit 20 of the PC 100, and incorporates a DMA controller (a second DMA controller), and an interrupt controller for processing a DMA request and an interrupt request that have occurred on the secondary ISA bus 53. The DMA controller is prepared for each of the ISA buses 22 and 53, because the DMA transfer operation must be synchronized with the ISA bus operation.

The secondary ISA bus 53 has at least one ISA slot (not shown) in which a desired ISA device 54A, etc. is loaded.

An SCSI controller or a PCMCIA controller is employed for the PCI devices 17B, etc., and 52A, etc. that can be connected to the primary PCI bus 16 and the secondary PCI bus 50, respectively. In addition, an FDC (a floppy disk controller), an IR (infrared communication) controller, or an audio controller, is employed for the ISA devices 29A, etc., and 54A, etc. that can be connected to the primary ISA bus 22 and the secondary ISA bus 53, respectively. A DMA channel is reserved for some of the ISA devices, such as an FDC.

Although many electric circuits other than those shown in FIG. 1 are required to constitute the PC 100 and the docking station 200, as they are well known to one having ordinary skills in the art and are not related to the subject of the present invention, no explanation for them will be given in this specification.

A BUS CYCLE ON A PCI BUS

A bus cycle on a PCI bus, especially, a cycle for the I/O access to the DMA controller, will now be explained with reference to FIGS. 2 and 3.

With reference to the PCI, a signal line AD(31:0) having a 32-bit width is used in common as an address bus and a data bus. FRAME# is a signal line indicating the start of a bus cycle, and a command transmitting device (hereinafter referred to as an "initiator") outputs a signal along this line. Signal line C/BE(3:0)#, which has a 4-bit width, is a kind of control bus, and is employed to transmit a command (e.g., a memory access request or an I/O access request), or to specify an access byte (bit) field among data transferred by units of every two words each. Signal line IRDY# (initiator ready) is employed by the initiator to indicate its own ready state. Signal line DEVSEL# (device select) is employed by a peripheral device addressed by the AD(31:0) (i.e., a "target" on the command receiving device) to respond for confirmation. TRDY# (target ready) is employed by the target to indicate it becomes ready.

The initiator is a device that serves as a bus master on the PCI bus. For example, during the I/O access cycle, the bridge circuit 14 serves as an initiator by substituting for the CPU 11 and transmitting a command to the primary PCI bus 16. The PCI device (for example, 17B or 52B) that receives a command from the CPU 11 across the primary PCI bus 16 or the secondary PCI bus 50 is a target. For example, the DMA controllers mounted in the bridge circuits 20 and 51 can be targets.

Figure 2:
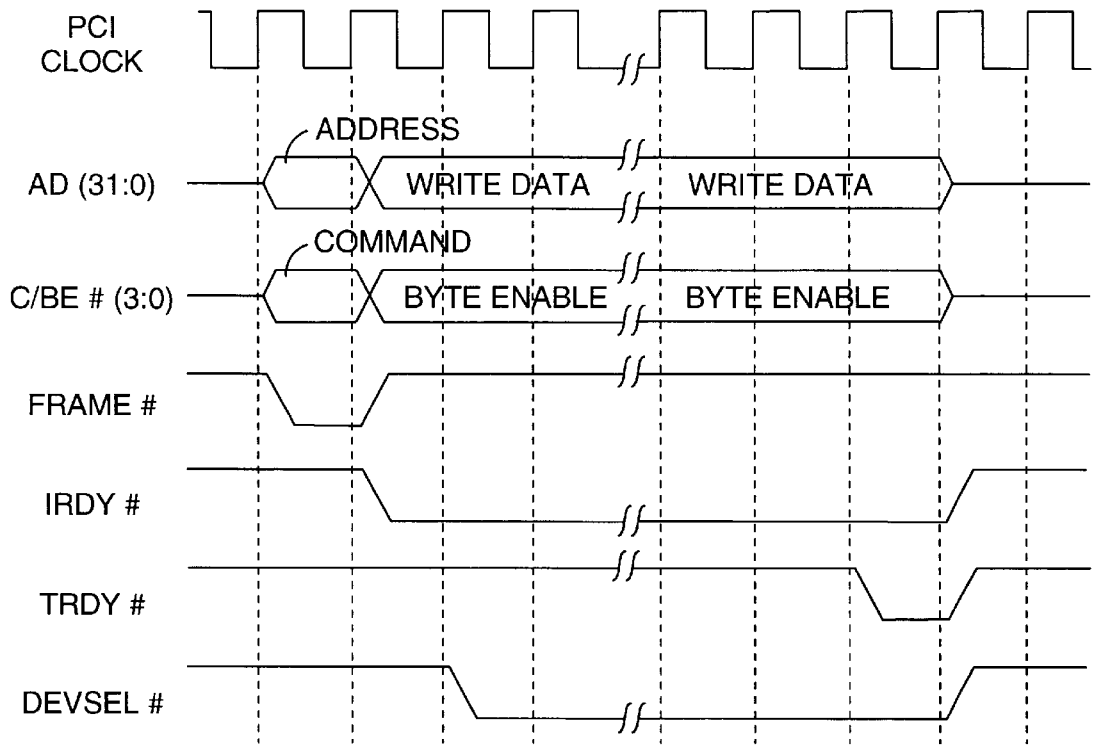
FIG. 2 is a timing chart for a write cycle that occurs on a PCI bus.

FIG. 2 is a timing chart showing write cycles that occur on the PCI bus.

(1) First, the initiator renders FRAME# active (i.e., low) to indicate the start of a bus cycle. During the first PCI clock cycle for a write cycle, AD(31:0) is in an address phase, and the initiator continuously transmits an address of the receiving device. For example, in order to access DMA channel 2, the initiator sends I/O address 004h (or 005h). At the moment, C/BE(3:0)# is in a command phase, and the initiator is continuously transmits 0011b to indicate an I/O write.

(2) In the next PCI clock cycle, the initiator returns FRAME# to inactive (i.e., high). When the initiator becomes ready, the initiator renders IRDY# active (i.e, low).

(3) Then, AD(31:0) enters a data phase, and the initiator continues to transmit write data comprising two words (=four bytes). C/BE#(3:0) enters a byte enable phase, and the initiator continues to transmit a byte enable value that indicates a write byte field in the two words data. For example, if a designated address is the least significant byte (i.e. a word count register for DMA channel 2) among the upper four bytes of the DMA 1 registers, the byte enable value is 1110b.

(4) When a target acknowledges that it is designated as an access destination by referring to an address and a command output to the bus, the target renders DEVSEL# active (i.e., low) as a response. When, for example, the DMA controller acknowledges that a command indicates an I/O write and that the I/O address reserved for the DMA controller (e.g., I/O address 005h) is transmitted on AD(31:0), the DMA controller renders DEVSEL# active.

(5) Following this, the target receives data transmitted to the AD(31:0), and writes the data in a predetermined field in its own control register. Further, when the target becomes ready, it renders TRDY# active (i.e., low).

(6) Finally, IRDY# and TRDY# are returned to inactive (i.e., high), and a bus cycle is thereafter terminated.

I/O READ CYCLE

Figure 3:
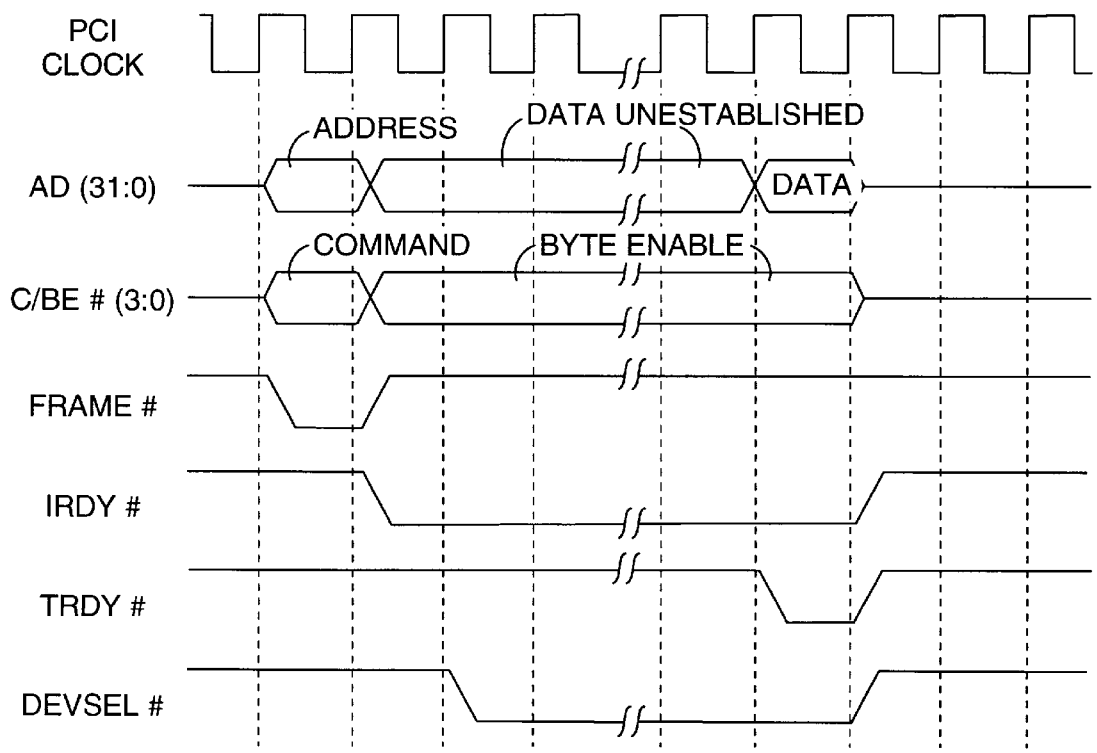
FIG. 3 is a timing chart for a read cycle that occurs on the PCI bus.

FIG. 3 is a timing chart showing read cycles that occur on the PCI bus.

(1) First, the initiator renders FRAME# active (i.e., low) to indicate the start of a bus cycle. During the first PCI clock cycle for a read cycle, AD(31:0) is in an address phase, and the initiator continuously transmits an address of the receiving device. For example, in order to access DMA channel 2, the initiator sends I/O address 004h (or 005h). At the moment, C/B E#(3:0) is in a command phase, and the initiator continuously transmits 0010b to indicate an I/O read.

(2) In the next PCI clock cycle, the initiator returns FRAME# to inactive (i.e., high). When the initiator becomes ready, the initiator renders IRDY# active (i.e., low).

(3) Then, AD(31:0) enters a data disabling phase. C/BE# (3:0) enters a byte enable phase, and the initiator continues to transmit a byte enable value that indicates a read byte field in the data. For example, a designated address is the least significant byte (a word count register of DMA channel 2) among the upper four bytes of the DMA 1 registers, and the byte enable value is 1110b.

(4) When a target acknowledges that it is designated as an access destination by referring to an address and a command output to the bus, the target renders DEVSEL# active (i.e., low) as a response. When, for example, the DMA controller acknowledges that a command indicates an I/O read and that I/O address reserved for the DMA controller (e.g., I/O address 005h) is transmitted on AD(31:0), the DMA controller renders DEVSEL# active.

(5) Following this, when the target becomes ready, it renders TRDY# active (i.e., low). At this time, the AD(31:0) is already in the data phase, and the target transmits to the AD(31:0) two words (=four bytes) that include a predetermined field designated by the address. When I/O address 005h is designated, the upper four bytes of the DMA 1 registers are transmitted across the AD(31:0).

(6) Finally, IRDY# and TRDY# are returned to inactive (i.e., high), and a bus cycle is thereafter terminated.

The bus cycle operation on the PCI bus that has been here described is specified by the PCI bus specification and is not the subject of the present invention. The purpose in this portion of the description is to provide background knowledge of the subject of the present invention.

CONSTRUCTION FOR I/O ACCESS OF A DMA CONTROLLER

A construction for I/O access of a DMA controller will now be explained.

The DMA controller commonly has eight DMA channels. An ISA device connected to an ISA bus (in this embodiment, including both the primary ISA bus 22 and the secondary ISA bus 53) is given a unique DMA channel for requesting DMA transfer. When the main memory 15 is to be accessed, the ISA device issues a data transfer request (a DMA request) to the DMA controller across the DMA channel reserved for itself. The DMA controller issues to the CPU a bus use request (a HOLD request) for accessing the main memory. When this request is acknowledged, a DMA transfer operation is begun. A specific example of the ISA device employing DMA transfer is an FDC (in an AT compatible machine, for example, DMA channel 2 is reserved for the FDC).

As is mentioned hereinabove, an inherent I/O port is reserved for a control register of each peripheral device, and the CPU 11 accesses the control register via the I/O port. For an AT compatible machine, normally, three kinds of I/O ports: address 000h to address 01Fh, address 0C0h to address 0DFh, and address 080h to address 09Fh, are reserved for the DMA controller. I/O port address 000h to 01Fh (corresponding to "DMA 1 registers" in the control registers) and I/O port address 0C0h to address 0DFh (corresponding to "DMA 2 registers" in the control register) are used to store control values (a start address for a DMA transfer and the word amount of data transfer) of the ISA devices reserved for DMA channels 0 through 3 and for DMA channels 4 through 7. I/O port address 080h to address 09Fh is reserved for the DMA transfer operation of the type that uses an extended memory area in memory space, and correspond to "DMA paging registers" in the control register. Table 1, 2 and 3 show the reserve table of DMA 1 registers, DMA 2 registers and the DMA paging register.

TABLE 1

I0 address
(DMA 1 Registers)
```
000h :   channel 0 address (low byte and upper byte)
001h :   channel 0 word count (low byte and upper byte)
002h :   channel 1 address (low byte and upper byte)
003h :   channel 1 word count (low byte and upper byte)
004h :   channel 2 address (low byte and upper byte)
005h :   channel 2 word count (low byte and upper byte)
006h :   channel 3 address (low byte and upper byte)
007h :   channel 3 word count (low byte and upper byte)
008h :   Status register
             Bit 7 -- channel 3 request
             Bit 6 -- channel 2 request
             Bit 5 -- channel 1 request
             Bit 4 -- channel 0 request
             Bit 3 -- Terminal count on channel 3
             Bit 2 -- Terminal count on channel 2
             Bit 1 -- Terminal count on channel 1
             Bit 0 -- Terminal count on channel 0
```

TABLE 2

(DMA 2 Registers)
```
0C0h :   channel 4 address (low byte and upper byte)
0C2h :   channel 4 word count (low byte and upper byte)
0C4h :   channel 5 address (low byte and upper byte)
0C6h :   channel 5 word count (low byte and upper byte)
0C8h :   channel 6 address (low byte and upper byte)
0CAh :   channel 6 word count (low byte and upper byte)
0CCh :   channel 7 address (low byte and upper byte)
0CEh :   channel 7 word count (low byte and upper byte)
0D0h :   Status register
             Bit 7 -- channel 7 request
             Bit 6 -- channel 6 request
             Bit 5 -- channel 5 request
             Bit 4 -- channel 4 request
             Bit 3 -- Terminal count on channel 7
             Bit 2 -- Terminal count on channel 6
             Bit 1 -- Terminal count on channel 5
             Bit 0 -- Terminal count on channel 4
```

TABLE 3

(Page Registers)
```
081h :   channel 2 Page register
082h :   channel 3 Page register
083h :   channel 1 Page register
087h :   channel 0 Page register
089h :   channel 6 Page register
08Ah :   channel 7 Page register
08Bh :   channel 5 Page register
```

I/O ACCESS OF A DMA CONTROLLER

The DMA transfer operation is performed in accordance with the direction written in the control register in the DMA controller (e.g., a transfer start address and the amount of data transfer). In other words, before the DMA transfer operation is started, the direction for the subject DMA channel must be written in advance in a pertinent byte/bit field among the control register. When the floppy disk controller using DMA channel 2 is to perform a DMA transfer operation, the CPU (more specifically, a BIOS or a device driver that manages the DMA transfer operation) accesses I/O address 004h or 005h, address 008h, and address 0D0h, and writes control values (see Tables 1 and 2). When the DMA transfer operation is to be performed by using the extended memory area in the memory (i.e., through a page frame), I/O address 081h must also be accessed (see Table 3).

According to the standard specifications of the PCI bus, data are transferred as a unit of two words each (i.e., four bytes) in a single bus cycle. Thus, even when only a part of a byte (bit) field in the control register need be accessed, just the necessary byte (bit) field can not be extracted and transferred. A single I/O port normally has a four word width (i.e., eight bytes), and one I/O access cycle is performed for a unit of the upper four bytes or the lower four bytes of the I/O port that includes a pertinent byte (bit) field. The necessary byte field in every four bytes transferred is to be designated by using a byte enable value (previously described). When addresses 004h, 005h and 081h assigned to DMA channel 2 are to be written/read, for example, I/O access is performed for the upper four bytes unit of DMA 1 registers and for the lower four bytes unit of the DMA paging registers. At the time of an I/O access to the upper four bytes of DMA 1 registers, byte enable value 1100b, which represents a byte field corresponding to DMA channel 2, is transmitted. At the time of an I/O access to the lower four bytes of the DMA paging register, byte enable value 1101b, which represents a byte field corresponding to DMA channel 2, is sent.

I/O ACCESS OF A DMA CONTROLLER

The construction of an I/O access to the DMA controller is well known and is not the subject of the present invention. The purpose of the explanations here given is to provide background knowledge of the subject of the present invention.

The unique point in this embodiment is that DMA controllers are incorporated in both the PCI-ISA bridge circuits 20 and 51 respectively, i.e., that the first DMA controller and the second DMA controller coexist. The DMA controllers are provided for the primary ISA bus 22 and the secondary ISA bus 53 respectively because the DMA controller must be synchronized with the bus operation (previously mentioned).

The reservations for the I/O ports are determined as the de facto standard of the AT compatible machine. According to the standard, only a single I/O space (i.e., a group of I/O ports that correspond to DMA 1 registers, DMA 2 registers, and DMA paging registers) is provided for a DMA controller. This means that even when two or more DMA controllers are present in the system, they must use the same I/O port. When a plurality of devices use the same I/O port in common, even if physically they are independently mounted, only a single device can be logically acknowledged. That is, the CPU 11 (more specifically, a BIOS or a device driver for controlling hardware operation) can not distinguish the first DMA controller from the second DMA controller.

In this embodiment, when an I/O access request for the DMA controller 20 or 51 has occurred, this request is processed by a specific function in the bus connection controller 60. This will be explained hereinafter.

(As will be understood, extended memory area is memory space, such as EMS (Expanded Memory Specification) memory, that exceeds the memory space that DOS (Disk Operating System) can directly control. The EMS memory is a memory area whose memory capacity exceeds 640 KB and is 32 MB at the maximum. The access to the EMS memory is managed by a device driver called a "memory manager" by means of four page frames, which are set between 640 KB and 1 MB.)

ARRANGEMENT OF A BUS CONNECTION CONTROLLER

The hardware arrangement of the bus connection controller 60 will now be explained.

The bus connection controller 60 includes a "PCI-PCI bridge" function and a "virtual target" function.

PCI-PCI BRIDGE FUNCTION

Figure 4:
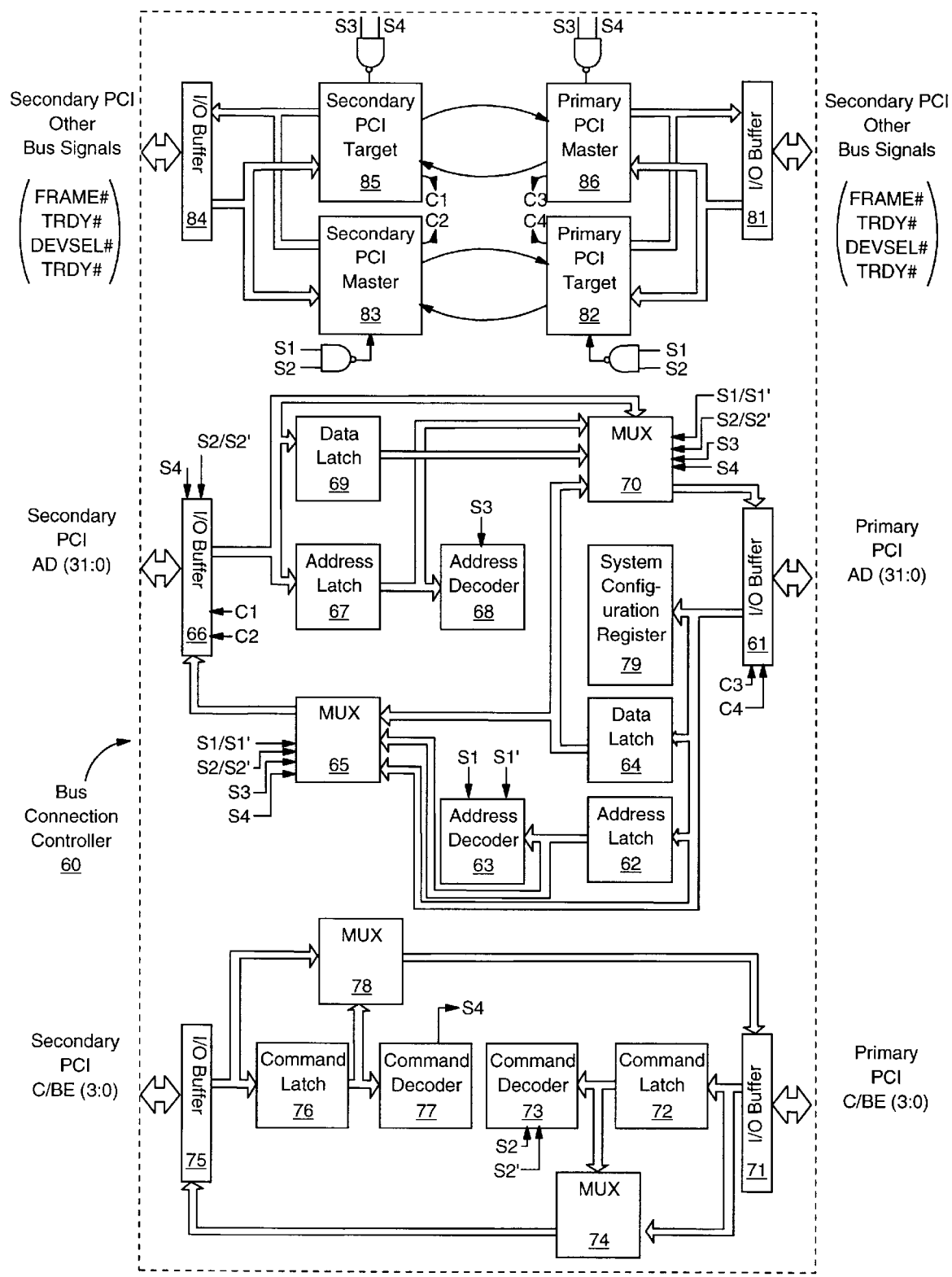
FIG. 4 is a diagram illustrating hardware components in a PCI-PCI bridge functional portion of a bus connection controller 60.

A "PCI-PCI bridge" function receives a bus signal across one of the PCI buses and drives the other PCI bus in accordance with the received bus signal. FIG. 4 is a diagram illustrating the extracted hardware components in the PCI-PCI bridge functional portion in the bus connection controller 60. The arrangement and the processing of the functional portion will now be briefly described.

(1) Bridge from the primary PCI bus 16 to the secondary PCI bus 50: AD(31:0), which is input across the primary PCI bus 16, is sent to an I/O buffer 61. In the address phase, AD(31:0) is temporarily held in an address latch 62, and is input to an address decoder 63. The address decoder 63 interprets the latched input address. When the address decoder 63 recognizes that the address corresponds to an I/O address reserved for the peripheral device on the secondary PCI bus 50 side, the address decoder 63 outputs control signal S1. When the address decoder 63 recognizes that the latched input address is an I/O address for the DMA controller, the address decoder 63 outputs control signal S1'. In the data phase, AD(31:0) is temporarily held by a data latch 64, and then is forwarded to a multiplexer 65. The multiplexer 65 multiplexes an address portion and a data portion stored in the latches 62 and 64, and transmits the resultant data to an I/O buffer 66. The operational timing for the multiplexer 65 is controlled by control signals S1, S1', S2, S2', S3 and S4. The operational timing for the I/O buffer 66 is controlled by control signals S2, S2', S4, C1 and C2.

A hardware block 79 is a system configuration register. The register 79 is employed to store system configuration information for the systems 100 and 200, and such information is written therein by a POST program, for example, during the initialization of the systems 100 and 200. The register 79 includes a register for writing the reserve table of the DMA channels (i.e., whether the DMA channels are being used for the first or for the second DMA controller. The register 79 is hereinafter referred to as a "DMA map register".). The DMA map register 79 is used to multiplex data when the I/O reading of the DMA controller is performed (see subdivision E-3).

C/BE(3:0), which is input across the primary PCI bus 16, is sent to an I/O buffer 71. In the command phase, C/BE(3:0) is temporarily held in a command latch 72, and is input to an command decoder 73. The command decoder 73 interprets the latched input address. When the command decoder 73 recognizes that the command is an I/O access request, the command decoder 73 outputs control signal S2. When the command decoder 73 recognizes that the latched input command is an I/O access request to the DMA controller, the command decoder 73 outputs control signal S2'. In the byte enable phase, C/BE(3:0) is forwarded to a multiplexer 74 without being latched. The multiplexer 74 multiplexes C/BE (3:0), which is separated into a command portion and a byte enable portion, and transmits the resultant data to an I/O buffer 75. The operational timing for the I/O buffer 75 is controlled by control signals C1 and C2.

Signals on the primary PCI bus 16 (e.g., FRAME#, IRDY#, DEVSEL#, and TRDY#), which are other than the above signals, are received by a primary PCI target state machine 82 via an I/O buffer 81. The primary PCI target state machine 82 and a secondary PCI master state machine 83 are activated by a logical product of control signals S1 and S2 (i.e. when a bus signal on the primary PCI bus 16 indicates an I/O access request directed to the secondary PCI bus 50). The activated secondary PCI master state machine 83 generates the same bus signal as that received by the target state machine 82, and transmits that signal to the secondary PCI bus 50 via an I/O buffer 84. The primary PCI target state machine 82 and the secondary PCI master state machine 83 output control signals C3 and C2, respectively. The control signals C3 and C2 are used to synchronously drive the I/O buffers 61, 66, 71 and 75.

(2) Bridge from the secondary PCI bus 50 to the primary PCI bus 16: AD(31:0), which is input across the secondary PCI bus 50, is sent to the I/O buffer 66. In the address phase, AD(31:0) is temporarily held in an address latch 67, and is input to an address decoder 68. The address decoder 68 interprets the latched input address. When the address decoder 68 recognizes that the address indicates an I/O address reserved for the peripheral device on the primary PCI bus 16 side, the address decoder 68 outputs control signal S3. In the data phase, AD(31:0) is temporarily held by a data latch 69, and then is forwarded to a multiplexer 70. The multiplexer 70 multiplexes an address portion and a data portion stored in the latches 67 and 69, and transmits the resultant data to the 110 buffer 61. The operational timing for the multiplexer 70 is controlled by control signals S1, S1', S2, S2', S3 and S4. The operational timing for the I/O buffer 61 is controlled by control signals S2, S2', S4, C3 and C4.

C/BE(3:0), which is input across the secondary PCI bus 50, is sent to the I/O buffer 75. In the command phase, C/BE(3:0) is temporarily held in a command latch 76, and is input to an command decoder 77. The command decoder 77 interprets the latched input address. When the command decoder 77 recognizes that the command is an I/O access request, the command decoder 77 outputs control signal S4. In the byte enable phase, C/BE(3:0) is forwarded to a multiplexer 78 without being latched. The multiplexer 78 multiplexes C/BE(3:0), which is separated into a command portion and a byte enable portion, and transmits the resultant data to the I/O buffer 71. The operational timing for the I/O buffer 71 is controlled by control signals C3 and C4.

Signals on the secondary PCI bus 50 (e.g., FRAME#, IRDY#, DEVSEL#, and TRDY#), which are other than the above signals, are received by a secondary PCI target state machine 85 via the I/O buffer 84. The secondary PCI target state machine 85 and a primary PCI master state machine 86 are activated by a logical product of control signals S3 and S4 (i.e. when a bus signal on the secondary PCI bus 50 indicates an I/O access request directed to the primary PCI bus 16). The activated primary PCI master state machine 86 generates the same bus signal as that received by the secondary PCI target state machine 85, and transmits that signal to the primary PCI bus 16 via the I/O buffer 81. The secondary PCI target state machine 85 and the primary PCI master state machine 86 output control signals C1 and C4, respectively. The control signals C1 and C4 are used to synchronously drive the I/O buffers 61, 66, 71 and 75.

The PCI buses 16 and 50 are independently driven by the PCI-PCI bridge function, so that the individual electric characteristics and stability are ensured. It should be noted that the buses 16 and 50 are driven asynchronously and that a delay time of several clock cycles is accrued between the reception of the target state machine 82 or 85 and the transmission of the master state machine 83 or 86. Since the PCI-PCI bridge function is a known technique that conforms to the PCI, no further detailed explanation will be given.

VIRTUAL TARGET FUNCTION

A "virtual target function" places the first and the second DMA controllers, which use an I/O port in common, under its control. More specifically, when the CPU 11 performs an I/O access to one of the DMA controllers, the virtual target functional portion substitutes for both the first and the second DMA controllers, which use the I/O port in common, and performs a predetermined handshaking operation with the CPU 11. In other words, the virtual target function is a function that acts as a virtual target device relative to an initiator (the CPU 11 or the bridge circuit 20). It should be noted that this is a significant function in the realization of the present invention.

Figure 5:
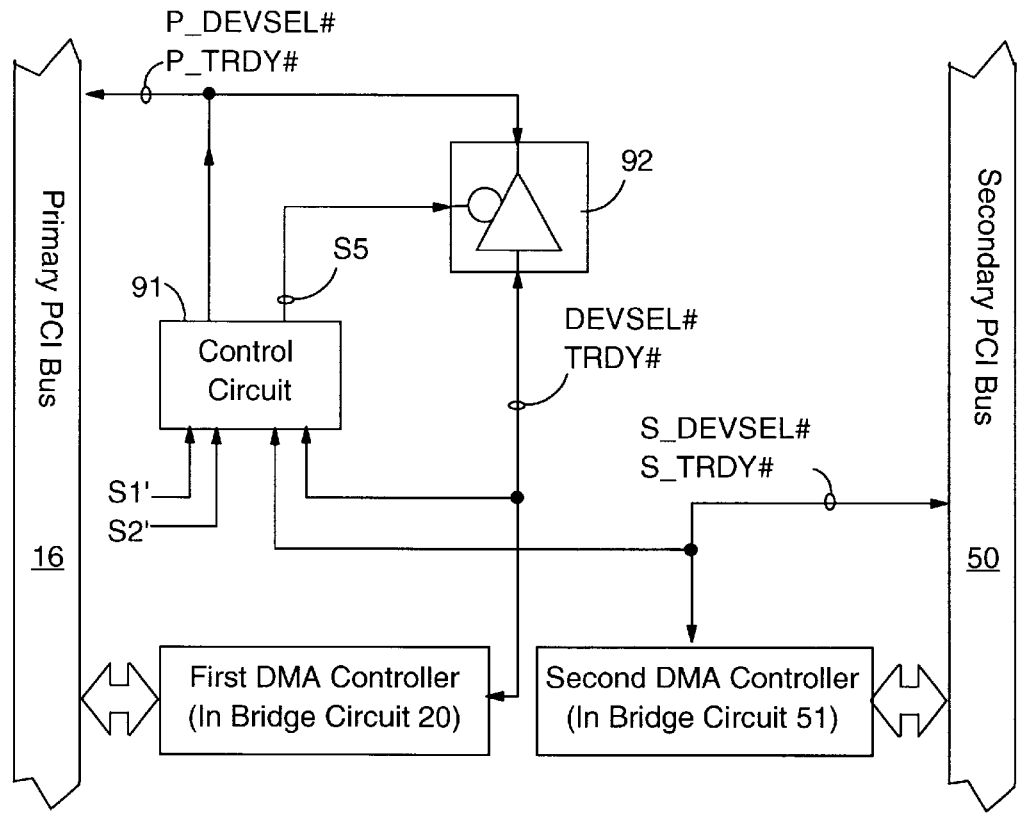
FIG. 5 is a diagram illustrating hardware components in a virtual target functional portion in the bus connection controller 60.
Figure 10:
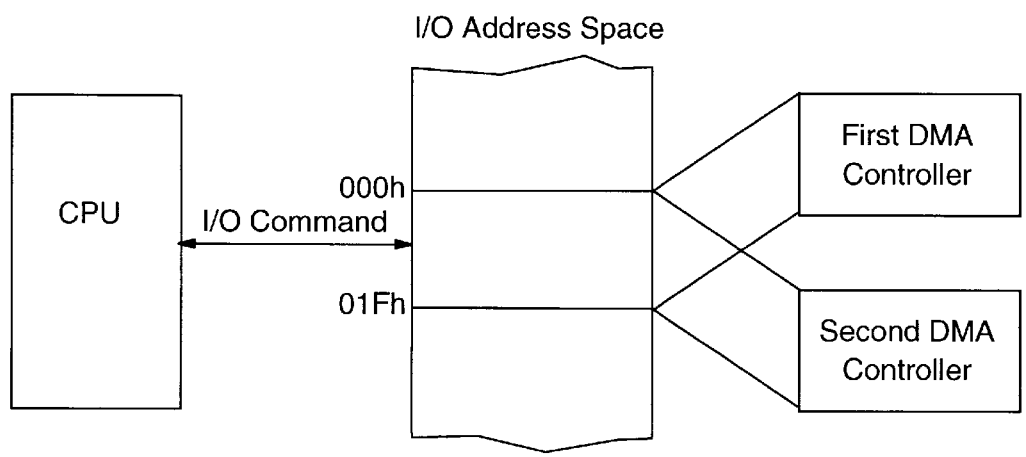
FIG. 10 is a conceptual diagram showing the condition wherein two or more DMA controllers are assigned to the same I/O address.

In FIG. 5 are shown hardware components extracted from the virtual target functional portion in the bus connection controller 60. As is shown in FIG. 5, the virtual target functional portion includes a control logic circuit 91 and a switching circuit 92.

The switching circuit 92 is the "first connection/disconnection switch" recited in the claims presented hereinafter and preferably is in the form of an analog switch, such as a three-state buffer. The input terminal of the tristate buffer 92 is connected to signal lines DEVSEL# and TRDY# that run from the first DMA controller. The output terminal of the tristate buffer 92 is connected to signal lines P_DEVSEL# and P_TRDY# in the primary PCI bus 16. Thus, by floating the tristate buffer 92 to the OFF condition, the signal lines DEVSEL# and TRDY# running from the first DMA controller can be disconnected from the primary PCI bus 16. Prefix "P_" indicates a bus signal in the primary PCI bus 16. In this embodiment, the first DMA controller is mounted in the bridge circuit 20 and the second DMA controller is mounted in the bridge circuit 51, as was previously mentioned.

The control logic circuit 91 receives control signals S1' and S2', and outputs control signal S5 to the control pin of the tristate buffer 92. The control logic circuit 91 is connected bidirectionally to the output the signal lines DEVSEL# and TRDY# of the first DMA controller, and also connected bidirectionally to the output signal lines S_DEVSEL# and S_TRDY# of the second DMA controller. Prefix "S_" indicates a bus signal in the secondary PCI bus 50. The control circuit 91 is connected unidirectionally to signal lines P_DEVSEL# and P_TRDY# in the primary PCI bus 16, so that the control circuit 91 can transfer signals DEVSEL# and TRDY#, which it internally generates, to the primary PCI bus 16.

Under normal conditions, i.e., during a bus cycle other than that for an I/O access to the DMA controller, the control circuit 91 maintains the ON condition of the tristate buffer 92. During this period, the signals DEVSEL# and TRDY# that are output by the first DMA controller are directly transferred to the primary PCI bus 16. Signals S_DEVSEL# and S_TRDY# that are output by the second DMA controller are transmitted along signal lines P_DEVSEL# and P_TRDY# to the primary PCI bus 16 via the control circuit 91.

During a bus cycle wherein I/O access to the DMA controller is performed, the control circuit 91 floats the tristate buffer 92 to the OFF condition, and cuts off signals DEVSEL# and TRDY#, which are output by the first DMA controller, from the primary PCI bus 16. The bus cycle can be identified by a logical product of control signals S1' and S2' (previously described). During the I/O access cycle, the control logic circuit 91 substitutes for the first and the second DMA controllers and acts as a target device (virtual target), and performs handshaking with the initiator (the bridge circuit 14 in this case). The functions of the control circuit 91 as a virtual target are roughly classified into the following two.

Acquisition of an I/O access cycle

DEVSEL# is a signal that is employed by the I/O accessed peripheral device to respond to an initiator for confirmation (previously described). When DEVSEL# is not returned within a predetermined time after the initiator has begun the bus cycle, the initiator assumes that the bus cycle has failed and aborts the operation.

During the I/O access to the DMA controller, DEVSEL#, which is output by the first DMA controller, is disconnected from the primary PCI bus 16 at the tristate buffer 92. Since the second DMA controller receives an I/O access request via the above described state machines 82 and 83, the second DMA controller outputs DEVSEL# with a delay time that is equivalent of the time required for reception. The control logic circuit 91 responds to the detection by the address decoder 63 of an address hit (i.e., the activation of signal S1'), and transmits P_DEVSEL# to the primary PCI bus 16. That is, as soon as the control logic circuit 91 confirms the occurrence of an I/O access to the DMA controller, so that the control logic circuit 91 establishes the bus cycle on behalf of the real target device.

Termination of I/O access cycle

TRDY# is a signal indicating that the peripheral device designated as a target of an I/O access request is in the I/O access enabled state (i.e., ready) (previously described). When TRDY# is returned to the initiator, it assumes that the target can exchange data, and then shortly completes the bus cycle. More specifically, the initiator returns IRDY# to inactive and terminates the data exchange.

With the hardware arrangement shown in FIG. 1, the first DMA controller is ready at an earlier time than is the second DMA controller. Since the second DMA controller receives an I/O access request via the above described state machines 82 and 83, the second DMA controller becomes ready with a delay time that is equivalent to the time required for reception. If the first DMA controller transmits signal TRDY# to the primary PCI bus 16, the bus cycle will be terminated before the second DMA controller as the real target device is ready. As a result, the bus cycle might be terminated without a correct I/O access cycle being established.

The control logic circuit 91 therefore disconnects TRDY#, which is output by the first DMA controller, from the primary PCI bus 16 during the I/O access of the DMA controller, and also does not transmit P_TRDY# to the primary PCI bus 16 until S_TRDY# is received from the second DMA controller. In other words, the control logic circuit 91 continues a bus cycle until both of the DMA controllers are ready.

As is described above, during a predetermined I/O access cycle, the control logic circuit 91 properly handles signals DEVSEL# and TRDY# for a response for confirmation, and acts as a target for the CPU 11. That is, during the predetermined I/O accessing, the first and the second DMA controllers are placed under the control of the virtual target. It should be noted that the control logic circuit 91 in this embodiment serves both as a "controller logic" and as a "second connection/disconnection switch" as recited in the claims which follow herein. The detailed processing for the virtual target will be explained hereinafter.

OTHER FUNCTIONS

The bus connection controller 60 has other functions. For example, the bus connection controller 60 performs electric connections and disconnections along with mechanical operations such as mounting the PC 100 in the docking station 200 or removing it therefrom. These other functions are not related to the subject of the present invention and no explanation for them will be given in this specification.

I/O ACCESS CONTROL BY A BUS CONNECTION CONTROLLER

The hardware arrangements of the systems 100 and 200 that realize the present invention have been primarily explained above. In the discussion which follows, the operational characteristics of hardware, especially, the virtual target functional portion, will be explained.

The setting of the control registers of the DMA controllers, i.e., the I/O access of the DMA controllers, is performed when a POST (Power-On Self Test) program is to be executed or immediately before a DMA transfer is begun. In the former case, an I/O write is performed, and in the latter case, both an I/O read and an I/O write are performed.

I/O WRITE OPERATION

Figure 6:
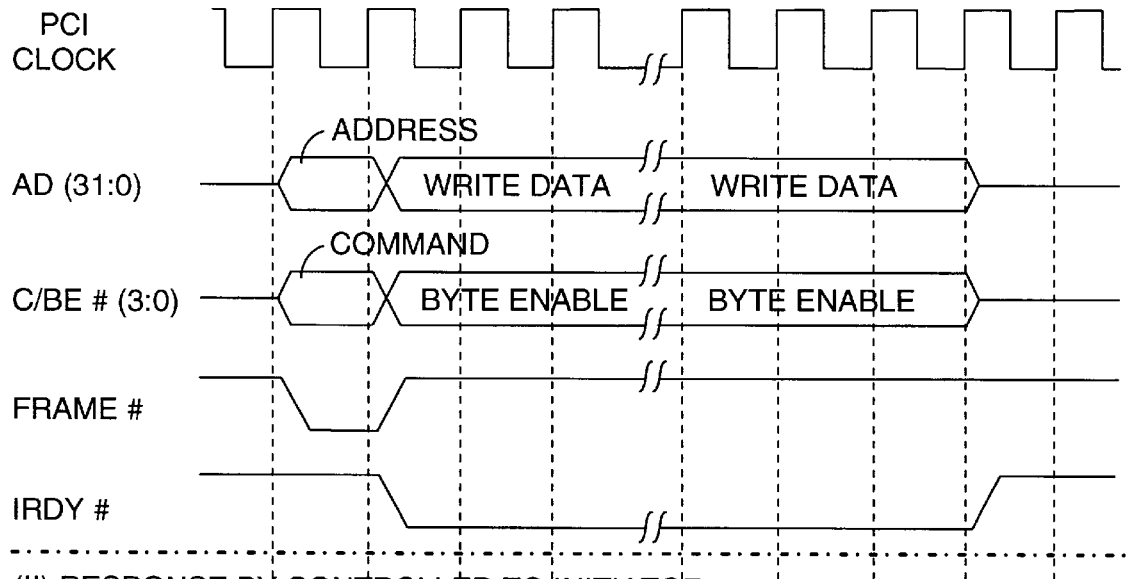
FIG. 6 is a timing chart for an I/O write operation for a DMA controller according to the present invention.
Figure 6:
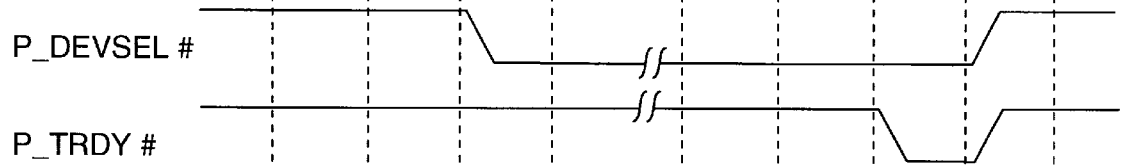
Figure 6:
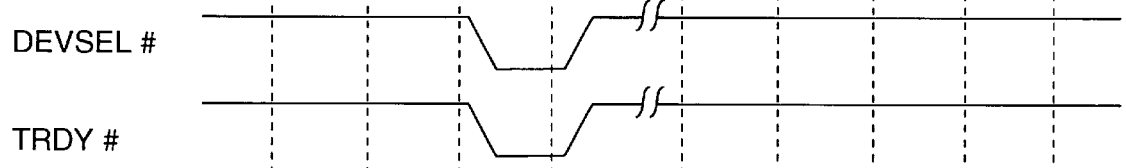
Figure 6:
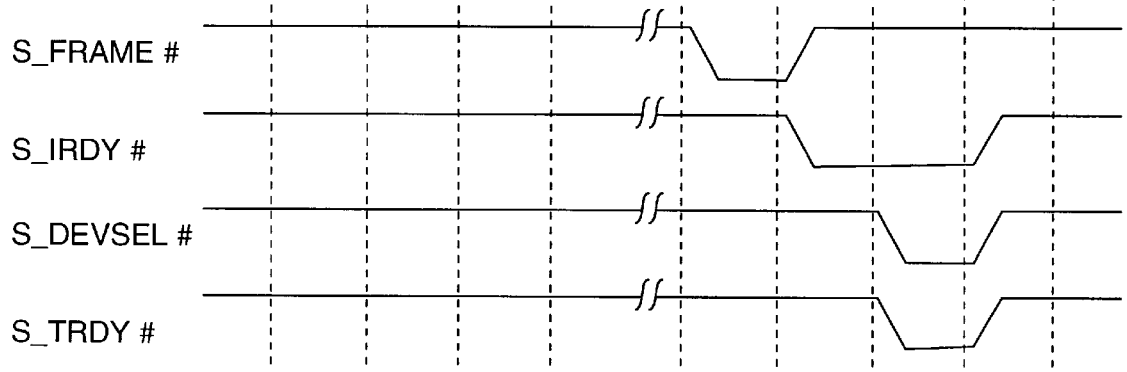

FIG. 6 is a timing chart of the I/O write operation relative to the DMA controllers. The timing chart in FIG. 6 is divided into the following bus signal groups: 1. bus signals output on the primary PCI bus 16 by the initiator (bridge circuit 14); 2. bus signals that the control circuit 91 outputs to the primary PCI bus 16; 3. bus signals that the first DMA controller outputs to the control circuit 91; and 4. bus signals on the secondary PCI bus 50.

First, the initiator (the bridge circuit 14 that substitutes for the CPU 11) renders FRAME# active (i.e., low) to begin the I/O write cycle, and outputs an I/O address (e.g., 005h) across signal line AD(31:0) and an I/O write command (0011b) to the signal line C/BE(3:0). When the initiator becomes ready, it renders IRDY# active (i.e., low). The initiator continuously transmits I/O write data to the AD(31:0) and a byte enable value to the C/BE(3:0). When an access to, for example, I/O address 005h (i.e., the least significant byte in the upper four bytes of DMA 1 registers (see Table 1)) is requested, a byte enable value is 1110b.

As the first DMA controller can receive an address and a command directly across the primary PCI bus 16, it can output DEVSEL# and TRDY# at a relatively earlier time (in FIG. 6, after the second PCI clock cycle). At this time, the control logic circuit 91 has been activated in response to the address decoder 63 (S1') and the command decoder 73 (S2'), and DEVSEL# and TRDY# are already disconnected from the primary PCI bus 16. The control logic circuit 91, in response to the detection by the address decoder 63 (i.e., the activation of signal S1'), transfers P_DEVSEL# to the primary PCI bus 16. It should be noted that the control circuit 91 does not output P_TRDY# at this time.

On the secondary PCI bus 50, the same bus cycle as that for the primary PCI bus 16 is begun with a delay. The delay of the bus cycle is caused by it passing through the target/master state machines 82 and 83, as was previously described. Prefix "S_" in FIG. 6 stands for a secondary side bus signal that includes a time delay. In response to S_AD (31:0), S_C/BE(3:0) (neither of them shown), S_FRAME# and S_IRDY#, the second DMA controller renders S_DEVSEL# and S_TRDY# active (i.e., low) at a relatively slow timing. It should be noted that at this time, the control logic circuit 91 has been activated and S_DEVSEL# and TRDY# are disconnected from the secondary PCI bus 50.

Further, upon receipt of TRDY# (i.e., S_TRDY#) from the second DMA controller, the control logic circuit 91 outputs P_TRDY# to the primary PCI bus 16. The initiator renders IRDY# inactive (i.e., high) and halts the output of data and a byte enable value to complete the I/O write cycle.

The write data are written unchanged to both the first and the second DMA controllers. If the I/O write is issued for DMA channel 2, which is reserved for the FDC, data are written to the pertinent byte fields in the control registers of both the first and the second DMA controllers. It should be noted that DMA channel 2 is used by only one of the DMA controllers because the employment of the same DMA channel by a plurality of DMA controllers is not permitted in view of the system configuration. Therefore, a control value is also written to a DMA controller that does not use DMA channel 2. It should be understood that even if a control value is written in an unused control register, the value is not employed for actual control and does not affect the system operation.

I/O READ OPERATION

Figure 7:
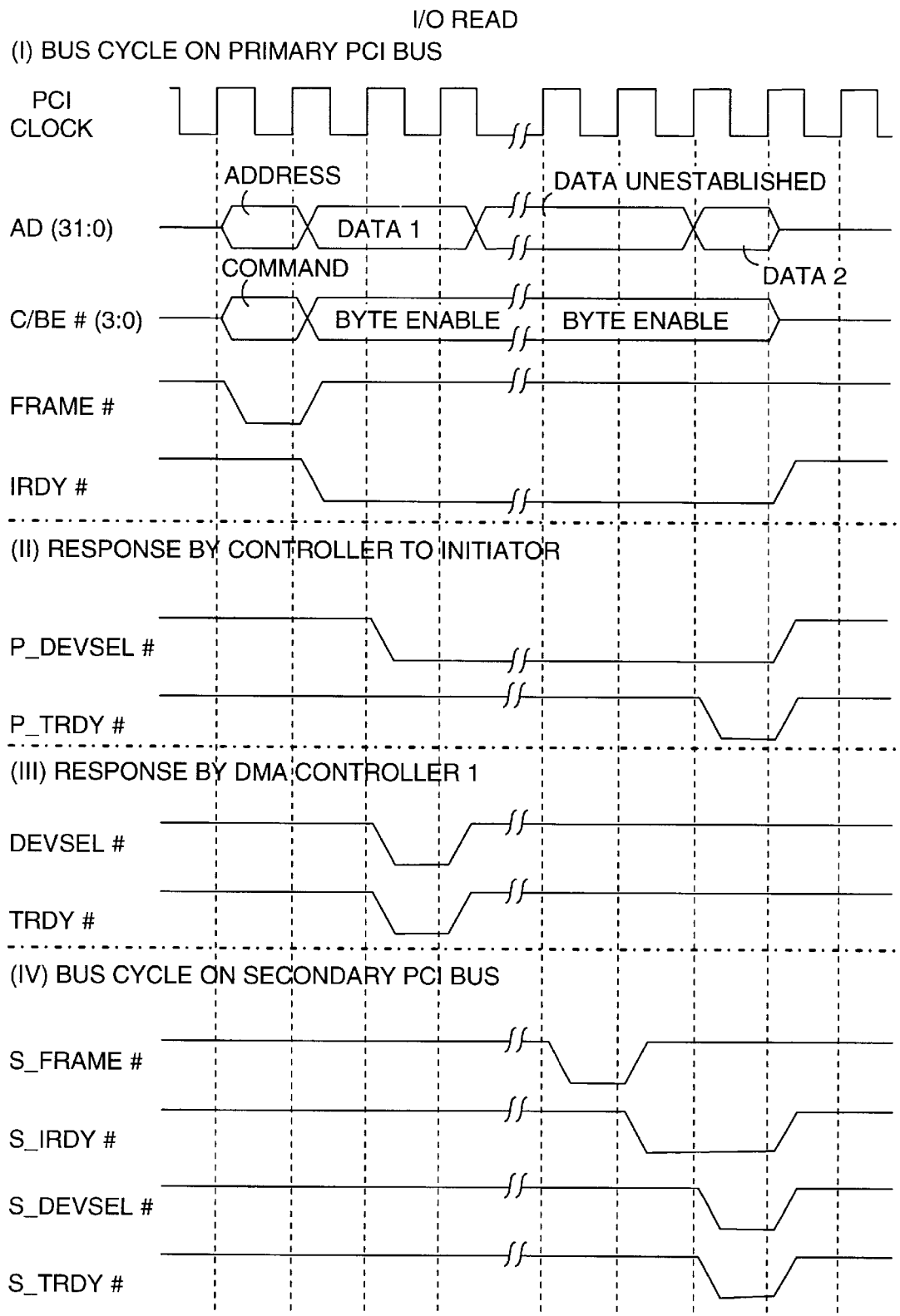
FIG. 7 is a timing chart for an I/O read operation for a DMA controller according to the present invention.

FIG. 7 is a timing chart for the I/O read operation relative to the DMA controller. The timing chart in FIG. 7 is divided into the following bus signal groups: 1. bus signals output on the primary PCI bus 16 by the initiator (bridge circuit 14); 2. bus signals that the control circuit 91 outputs to the primary PCI bus 16; 3. bus signals that the first DMA controller outputs to the control circuit 91; and 4. bus signals on the secondary PCI bus 50.

First, the initiator (the bridge circuit 14 that substitutes for the CPU 11) renders FRAME# active (i.e., low) to begin the I/O read cycle, and outputs an I/O address (e.g., 005h) across the signal line AD(31:0), and an I/O read command (0010b) to the signal line C/BE(3:0). When the initiator becomes ready, it renders IRDY# active (i.e., low). The initiator continuously outputs a byte enable value to the C/BE(3:0). When an access to, for example, I/O address 005h (i.e., the least significant byte in the upper four bytes of DMA 1 registers (see Table 1)) is requested, a byte enable value is 1110b.

As the first DMA controller can receive an address and a command directly across the primary PCI bus 16, it can output I/O read data, DEVSEL# and TRDY# at a relatively earlier time (in FIG. 7, after the second PCI clock cycle). Therefore, a corresponding control register value (data 1) in the first DMA controller is transmitted across the AD(31:0). Data 1 is temporarily held by the data latch 64. At this time, the control logic circuit 91 has been activated in response to the address decoder 63 (S1') and the command decoder 73 (S2'), and DEVSEL# and TRDY# are already disconnected from the primary PCI bus 16. The control logic circuit 91, in response to the detection by the address decoder 63 of the address hit (i.e., the activation of signal S1'), transfers P_DEVSEL# to the primary PCI bus 16. It should be noted that the control logic circuit 91 does not output P_TRDY# at this time. The first DMA controller returns DEVSEL# and TRDY# to inactive (i.e., high) and halts the output of data, and the AD(31:0) is continuously maintained in a data unestablished phase.

On the secondary PCI bus 50, the same bus cycle as that for the primary PCI bus 16 is begun with a delay. The delay of the bus cycle is caused by it passing through the target/ master state machines 85 and 86, as was previously described. Prefix "S_" in FIG. 7 stands for a secondary side bus signal that includes a delay time. In response to S_AD (31:0), S_C/BE(3:0) (neither of them shown), S_FRAME# and S_IRDY#, the second DMA controller renders S_DEVSEL# and S_TRDY# active (i.e., low) at a relatively slow timing, and outputs I/O read data. It should be noted that at this time, the control circuit 91 has been activated and S_DEVSEL# and TRDY# are disconnected from the secondary PCI bus 50.

The I/O read data that are output by the second DMA controller are temporarily held by the data latch 69. Then, the multiplexer 70 multiplexes the data held in the data latch 69, together with data 1 held in the data latch 64. The data obtained by multiplexing are transmitted as data 2 to AD(31:0) in the primary PCI bus 16. The multiplexer 70 performs the multiplexing operation according to the contents of the DMA map register in the system configuration register 79.

Following this, upon receipt of TRDY# (i.e., S_TRDY#), also from the second DMA controller, the control logic circuit 91 also outputs P_TRDY# to the primary PCI bus 16. Upon receipt of data 2, the initiator renders IRDY# inactive (i.e., high) and halts the output of a byte enable value to complete the I/O read cycle.

MULTIPLEXING OPERATION FOR DATA 2

Data are transmitted across the PCI bus as units of two words (i.e., four bytes). However, in the four bytes, control register fields for a plurality of DMA channels coexist. For example, the lower four bytes in DMA 1 registers are reserved for DMA channel 0 and DMA channel 1 (see Table 1).

Because of the restriction imposed by the system configuration, neither DMA channel is overlapped and used by both the first and the second DMA controllers simultaneously. Each DMA channel is used by only one of the DMA controllers in such a manner that DMA channel 0 is employed by only the second DMA controller and DMA channel 1 is employed by only the first DMA controller (or a channel is not used by either DMA controller). The reserve table of the DMA channels are stored in the DMA map register in the system configuration register 79 (previously mentioned).

The multiplexer 70, first accesses the system configuration register 79 and acquires the contents of the DMA map register. Among the four bytes to which I/O read access is performed, a byte/bit field that is pertinent to the DMA channel used by the first DMA controller is acquired from data 1 (i.e., I/O read data from the first DMA controller) held in the data latch 64. A byte field that is pertinent to the DMA channel used by the second DMA controller is acquired from I/O read data from the second DMA controller held in the data latch 69. Then, the acquired data for the byte/bit fields are multiplexed and the resultant data are transmitted to AD(31:0) of the primary PCI bus 16.

Through the above described multiplexing procedures, a control register value of the DMA channel currently used is fetched in the byte/bit fields for data 2 (final I/O read data). When, for example, the second DMA controller is using DMA channel 0 and the lower four bytes in DMA 1 registers are read, the I/O read data from the second DMA controller are fetched in the lower first and second bytes.

Thus, the CPU 11 (more specifically, a BIOS or a device driver for controlling DMA transfer) can obtain meaningful control contents and execute adequate DMA control.

The present invention has been described in detail while referring to a specific embodiment. However, it should be obvious to one having ordinary skill in the art that various modifications or revisions of the embodiment are possible within the scope of the present invention. For example, when a plurality of devices are reserved for the same I/O address, according to the present invention, I/O access can be appropriately performed for these devices.

That is, although the present invention has been disclosed by using an example, it should not be limited to that example. To fully understand the subject of the present invention, the claims should be referred to.

The reserved content of the I/O ports, etc., which are described in this specification, are based on the standards for the IBM PC/AT.

In the drawings and specifications there has been set forth preferred embodiments of the invention and, although specific terms are used, the description thus given uses terminology in a generic and descriptive sense only and not for purposes of limitation.

What is claimed is:

1. An information processing system comprising:

a central processing unit (CPU);

a plurality of peripheral devices operatively associated with said CPU;

said CPU controlling said peripheral device by assigning respective I/O addresses to the control registers of said peripheral devices;

a first DMA controller to which a predetermined I/O address is assigned;

a second DMA controller to which said predetermined I/O address is assigned; and controller logic responding to a request for I/O access of said predetermined I/O address by replicating operations of said first and said second DMA controllers so as to respond to said CPU.

2. An information processing system comprising:

a central processing unit (CPU) which controls peripheral devices by employing an I/O access method;

a bus defining an interconnection between said CPU and peripheral devices across which handshaking occurs between a command transmitting device activating an initiator ready (IRDY) signal and a command receiving device activating a device select (DEVSEL) signal and a target ready (TRDY) signal;

a first DMA controller, connected to said bus, to which a predetermined I/O address is assigned;

a second DMA controller, connected to said bus, to which said predetermined I/O address is assigned;

a first connection/disconnection switch selectively connecting and disconnecting a device select (DEVSEL) signal and a target ready (TRDY) signal that are output from said first DMA controller;

a second connection/disconnection switch selectively connecting and disconnecting a device select (DEVSEL) signal and a target ready (TRDY) signal that are output from said second DMA controller; and controller logic, connected to said bus, which receives said device select (DEVSEL) signals and said target ready (TRDY) signals that are output by said first and said second DMA controllers, and directs opening and closing of said first and said second connection/disconnection switches in accordance with I/O accesses that occur on said bus.

3. An information processing system according to claim 2, wherein said bus conforms to the PCI (Peripheral Component Interconnect) bus specification.

4. A control method, for an information processing system that includes a plurality of peripheral devices;

a CPU of the type which controls said peripheral devices by using an I/O access method;

a bus for forming an interconnection between said CPU and said peripheral devices, across which handshaking occurs between a command transmitting device activating an initiator ready (IRDY) signal and a command receiving device activating a device select (DEVSEL) signal and a target ready (TRDY) signal;

a first DMA controller, connected to said bus, for which a predetermined I/O address is assigned; and a second DMA controller, connected to said bus, for which said predetermined I/O address is assigned, the method comprising the steps of:

(a) initiating an access by said CPU to said predetermined I/O address;

(b) activating said device select (DEVSEL) signal on said bus in response to said access being initiated; and (c) activating said target ready (TRDY) signal on said bus in response to said target ready (TRDY) signal being output by both of said first and said second DMA controllers.

5. A control method according to claim 4, wherein when access to said predetermined I/O address is a write access, said first and said second DMA controllers unchanged write data, which are received across said bus, into their own control registers respectively.

6. A control method according to claim 4, wherein, when access to said predetermined I/O address is a read access, contents of said control registers of said first and said second DMA controllers are multiplexed and the resultant data are transmitted to said bus.

7. A control method according to claim 6, wherein a multiplexing process is performed in accordance with the reserve table of the DMA channels of said first and said second DMA controllers.

8. A control method according to claim 4, wherein said bus conforms to the PCI (Peripheral Component Interconnect) bus specification.

9. An information processing system comprising:

a central processing unit (CPU) which controls peripheral devices by employing an I/O access method;
said CPU communicating with peripheral devices via a bus across which handshaking occurs between a command transmitting device activating an initiator ready (IRDY) signal and a command receiving device activating a device select (DEVSEL) signal and a target ready (TRDY) signal;

a first peripheral device, connected to said bus, for which a predetermined I/O address is assigned;

a second peripheral device, connected to said bus, for which said predetermined I/O address is assigned;

a first connection/disconnection switch for connecting and disconnecting a device select (DEVSEL) signal and a target ready (TRDY) signal that are output from said first peripheral device;

a second connection/disconnection switch for connecting and disconnecting a device select (DEVSEL) signal and a target ready (TRDY) signal that are output by said second peripheral device; and controller logic, connected to said bus, for receiving said device select (DEVSEL) signals and s aid target ready (TRDY) signals that are output by said first and said second peripheral devices, and for opening and closing said first and said second connection/disconnection switches in response to I/O accesses that occur on said bus.

10. An information processing system comprising:

a central processing unit (CPU) which controls peripheral devices connected across a bus by employing an I/O access method in which a single bus cycle is completed by handshaking between said CPU and peripheral devices on said bus;

a first peripheral device, connected to said CPU, for which a predetermined I/O address is assigned;

a second peripheral device, connected to said CPU, for which said predetermined I/O address is assigned; and controller logic responding to the beginning of a bus cycle for I/O access of one of said first and said second peripheral devices by inhibiting a termination of said bus cycle until said handshaking is enabled between said first and said second peripheral devices and said CPU.

11. An information processing system comprising:

a central processing unit (CPU) which controls peripheral devices by an I/O access method;

a first bus forming an interconnection between said CPU and peripheral devices and across which handshaking occurs between a command transmitting device activating an initiator ready (IRDY) signal and a command receiving device activating a device select (DEVSEL) signal and a target ready (TRDY) signal;

a first peripheral device connected to said first bus and to which a predetermined I/O address is assigned;

a second bus forming an interconnection between said CPU and peripheral devices and across which handshaking occurs between a command transmitting device activating an initiator ready (IRDY) signal and a command receiving device activating a device select (DEVSEL) signal and a target ready (TRDY) signal;

a bus connection circuit asynchronously and bidirectionally connecting said first bus to said second bus;

a second peripheral device connected to said second bus and to which said predetermined I/O address is assigned;

a connection/disconnection switch selectively connecting and disconnecting said device select (DEVSEL) signal and said target ready (TRDY) signal that are output by said first peripheral device; and control logic responding to a bus cycle in which there is an access to said predetermined I/O address occuring on said first bus by (1) activating said device select (DEVSEL) signal on said first bus in response to an occurrence of said access, (2) cutting off said connection and disconnection switch until the bus cycle is terminated, and (3) activating, on said first bus, said target ready (TRDY) signal from said second peripheral device upon receipt of said target ready signal and for terminating said bus cycle.

12. An information processing system according to claim 11, wherein said first and said second buses conform to the PCI (Peripheral Component Interconnect) bus specification.

* * * * *